(12) United States Patent
Tadamasa

(10) Patent No.: US 7,441,702 B2
(45) Date of Patent: Oct. 28, 2008

(54) CARD PROCESSING DEVICE

(75) Inventor: Akihiro Tadamasa, Kyoto (JP)

(73) Assignee: OMRON Corporation, Kyoto-Shi, Kyoto (JP)

( * ) Notice: Subject to any disclaimer, the term of this patent is extended or adjusted under 35 U.S.C. 154(b) by 0 days.

(21) Appl. No.: 10/576,686

(22) PCT Filed: Sep. 15, 2004

(86) PCT No.: PCT/JP2004/013884

§ 371 (c)(1),
(2), (4) Date: Apr. 21, 2006

(87) PCT Pub. No.: WO2005/041116

PCT Pub. Date: May 6, 2005

(65) Prior Publication Data

US 2007/0080231 A1 Apr. 12, 2007

(30) Foreign Application Priority Data

Oct. 22, 2003 (JP) .............................. 2003-361468

(51) Int. Cl.
*G06K 5/00* (2006.01)
(52) U.S. Cl. ..................................... 235/449; 235/479
(58) Field of Classification Search ................. 235/475, 235/479, 480, 440, 441, 481; 271/3.14–3.16
See application file for complete search history.

(56) References Cited

U.S. PATENT DOCUMENTS

| 5,594,233 | A | 1/1997 | Kenneth et al. |
| 6,164,538 | A | 12/2000 | Furuya et al. |
| 6,250,552 | B1 | 6/2001 | Hirasawa |
| 6,460,771 | B1 | 10/2002 | May |
| 6,629,643 | B1 | 10/2003 | Nagata et al. |
| 6,851,613 | B2 * | 2/2005 | Yoshii ........................ 235/479 |
| 2005/0218227 | A1 * | 10/2005 | Takita et al. ................ 235/441 |

FOREIGN PATENT DOCUMENTS

EP 1067474 1/2001

(Continued)

OTHER PUBLICATIONS

J. Svigals, "Unauthorized Card Stripe Reading Inhibitor", IBM Technical Disclosure Bulletin, IBM Corp, vol. 26, No. 6, Nov. 1, 1983, p. 2707.

*Primary Examiner*—Daniel St.Cyr
(74) *Attorney, Agent, or Firm*—Antonelli, Terry, Stout & Kraus, LLP.

(57) ABSTRACT

A card processing device (100) that handles a magnetic card and an IC card wherein, when a card (50) is taken into a main body (20) and if the card is a magnetic card, the inserted card (50) is taken in by intermittently transporting the card to a predetermined position and, after that, by continuously transporting the card and, if the card is an IC card, the inserted card (50) is taken in by continuously transporting the card. When the card (50) is ejected out of the main body (20) and if the card is a magnetic card, the card is ejected by continuously transporting the card to a predetermined position and, after that, by intermittently transporting the card and, if the card is an IC card, the card is ejected by continuously transporting the card.

5 Claims, 17 Drawing Sheets

FOREIGN PATENT DOCUMENTS

| | | |
|---|---|---|
| EP | 1 422 654 | 5/2004 |
| JP | 5-101230 | 4/1993 |
| JP | 05-101230 | 4/1993 |
| JP | 8-030736 | 2/1996 |
| JP | 10-247225 | 9/1998 |
| JP | 2004-171205 | 6/2004 |
| WO | WO 01/01337 | 1/2001 |

\* cited by examiner (d)

(e)

(f)

(g)

(h)

(i)

(j)

CARD PROCESSING DEVICE

TECHNICAL FIELD

The present invention relates to a card processing device that processes a card on which magnetic information is recorded and a card on which magnetic information is not recorded.

BACKGROUND ART

Some card processing device mounted on a bank's automated teller machine (hereinafter called ATM) processes both a magnetic card on which magnetic information is recorded and an IC card on which magnetic information is not recorded (for example, see JP-A-5-101230 (prior art 1) and Japanese Patent Application No. 3326351 (prior art 2)). When a magnetic card is inserted from the card insertion slot of this card processing device, the magnetic information recorded in the magnetic stripe on the card is read by the magnetic head while the magnetic card is transported by the transport means, such as a motor and rollers, at a constant speed. When an IC card is inserted from the card insertion slot, the IC card is transported by the transport means described above to a predetermined position inside the main body and is stopped there and, after that, the information recorded in the IC chip in the card is read. When the IC card is a contact IC card, the contactor on the device side is brought into contact with the IC terminal of the card to read the information from the IC chip; when the IC card is a non-contact type IC card, the antenna on the card wirelessly communicates with the antenna on the device side to read the information from the IC chip. The card processing device not only reads information but also writes information as necessary. After the read processing or the write processing for the card is finished, the transport means ejects the card out of the device.

On an ATM installed in a bank etc., there is a danger that a fake reader is sometimes put in front of the real card processing device on the ATM to illegally obtain card information on a magnetic card. This fake reader has a memory in which information read from a magnetic card is stored. When the user is not aware of such a fake reader or the user believes that the fake reader is a part of the real card processing device and inserts a magnetic card into the card slot of that fake reader, the information on the magnetic card is read by the fake reader and stored in the memory. On the other hand, the magnetic card inserted into the fake reader is transported to the real card processing device where the proper card reading processing is performed. In this case, the ATM performs normal processing. When the card processing is terminated, the real card processing device ejects the magnetic card and returns it to the user via the card slot of the fake reader. Because the card is returned to the user normally, most users are hardly aware that the card information has been read illegally. In some cases, the card information is read by the fake reader when the card is returned. After that, the person who attached the fake reader removes it from the ATM, reads the illegally-read card information from the memory, and forges a card based this card information.

To prevent the illegal capture of card information such as the one described above, there is a technology to intermittently transport a magnetic card when the magnetic card is exposed outside of the real card processing device at magnetic card insertion time or ejection time (for example, see J. Svigals: "Unauthorized Card Stripe Reading Inhibitor", IBM TECHNICAL DISCLOSURE BULLETIN, vol. 26, No. 6, Nov. 1, 1983, page 2707 XP002145300, New York. (prior art 3)). There is another technology to randomize the intermittent transport of a magnetic card to make the intermittent transport of a magnetic card more complex and to make it difficult to illegally obtain the card information (for example, see U.S. Pat. No. 6,460,771 (prior art 4)). There is still another technology to temporarily stop the transport of a magnetic card when a part of the card sticks out of the card slot at a magnetic card take-in time or ejection time (for example, see JP-A-2001-22894 (prior art 5)). In general, the correct reading of the information recorded in the magnetic stripe on a magnetic card requires the constant, continuous movement of a card in relation to the magnetic head. The intermittent transport or temporary stop of a magnetic card as described above makes it impossible to correctly read recorded information from the magnetic stripe, thus preventing a fake reader from obtaining card information illegally.

As described above, some card processing devices process not only magnetic cards but also contact and non-contact IC cards. In such a card processing device, the transport mechanism for transporting a magnetic card and the transport mechanism for transporting an IC card are generally shared. Therefore, the transport mechanism for intermittently transporting a magnetic card as in prior art 3 or prior art 4 or the transport mechanism for temporarily stopping the transport of a card as in prior art 5, if provided, requires that not only a magnetic card but also an IC card be transported intermittently or stopped temporarily. However, the card information in an IC card, which is recorded in an IC chip, is not read by a fake reader and, unlike a magnetic card, there is no need for preventing the card information from being read illegally. Transporting an IC card intermittently in spite of this fact makes the IC card transport time unnecessarily longer than that for transporting the IC continuously. Temporarily stopping the IC card transport makes the IC card transport time still longer.

DISCLOSURE OF THE INVENTION

The prior art technology, if applied to a card processing device that processes both a magnetic card and a non-magnetic card as described above, makes the transport time of an IC card unnecessarily longer and becomes an impediment to the high-speed processing of an IC card. Considering that an IC card will become more popular than a magnetic card in future, a long processing time for an IC card is not desirable because it might decrease the commercial value of an ATM. Therefore, it is an object of the present invention to provide a card processing device capable of processing non-magnetic cards quickly while preventing card information on magnetic cards from being illegally obtained.

The card processing device according to the present invention is a card processing device that handles a first card on which magnetic information is recorded and a second card on which magnetic information is not recorded, comprising transportation means for transporting the first and second cards; and control means for controlling the transportation means according to a type of a card. When a card is taken in and/or ejected, the control means controls the transportation means in such a way that the first card is intermittently transported and the second card is continuously transported.

The first card is typically a magnetic card on which magnetic information is recorded in a magnetic stripe, and also includes a hybrid-type IC card having a magnetic stripe and an IC chip. This IC card may be a contact IC card or a non-contact IC card. On the other hand, the second card is typically a contact or non-contact IC card having an IC chip and, in addition, may be a card on which information is optically recorded.

The intermittent transport includes not only an intermittent transport at an interval of a regular period but also an intermittent transport at an interval of an irregular period. The intermittent transport in the present invention includes not only an intermittent transport into one direction only but also a transport into one direction accomplished by alternately repeating the move between one direction and the other. When a card is taken in, it is desirable to intermittently transport the card only in the first stage to reduce the take-in time; however, the present invention does not eliminate the intermittent transport from the start of the card take-in to the end. Similarly, when a card is ejected, it is desirable to intermittently transport the card only in the last stage to reduce the ejection time; however, the present invention does not eliminate the intermittent transport from the start of the card ejection to the end. A card may be intermittently transported when the card is taken in and/or when the card is ejected.

Intermittently transporting the first card and continuously transporting the second card as described above makes it difficult to illegally obtain card information from the first card on which magnetic information is recorded because the card is intermittently transported, and quickly transports the second card, on which magnetic information is not recorded and for which no illegality prevention is required, because the card is continuously transported and thus reduces the processing time.

In an embodiment of the present invention, when a card is taken in and if the card inserted from a card insertion slot is the first card, the transportation means takes in the first card by intermittently transporting the first card to a predetermined position and, from the predetermined position, by continuously transporting the first card and, if the card inserted from the card insertion slot is the second card, the transportation means takes in the second card by continuously transporting the second card regardless of a position thereof.

Thus, setting the predetermined position to a limit position, where there is no danger that the magnetic information on the first card is illegally obtained, prevents information from being obtained illegally by intermittently transporting the first card if there is a danger that the magnetic information is illegally obtained when the first card is taken in, and quickly takes in the first card by continuously transports it if there is no danger that the magnetic information is illegally obtained. The second card can be quickly taken in from the beginning without intermittently transporting it.

In an embodiment of the present invention, when a card is ejected and if the card that is ejected is the first card, the transportation means ejects the first card by continuously transporting the first card to a predetermined position and, from the predetermined position, by intermittently transporting the first card and, if the card that is ejected is the second card, the transportation means ejects the second card by continuously transporting the second card regardless of a position thereof.

Thus, setting the predetermined position to a limit position, where there is a danger that the magnetic information on the first card is illegally obtained, reduces the card ejection time by continuously transporting the first card if there is no danger that the magnetic information is illegally obtained when the first card is ejected, and prevents information from being obtained illegally by intermittently transporting the first card if there is a danger that the magnetic information is illegally obtained. The second card can be quickly ejected from the beginning without intermittently transporting it.

In an embodiment of the present invention, when a card is taken in and if the card inserted from a card insertion slot is the first card, the transportation means takes in the first card by intermittently transporting the first card to a first position in a main body of the card processing device and, from the first position, by continuously transporting the first card and, if the card inserted from the card insertion slot is the second card, the transportation means takes in the second card by continuously transporting the second card regardless of a position thereof. In addition, when a card is ejected and if the card that is ejected is the first card, the transportation means ejects the first card by continuously transporting the first card to a second position near the card insertion slot and, from the second position, by intermittently transporting the first card and, if the card that is ejected is the second card, the transportation means ejects the second card by continuously transporting the second card regardless of a position thereof.

Thus, setting the first position to a limit position, where there is no danger that the magnetic information on the first card is illegally obtained, prevents information from being obtained illegally by intermittently transporting the first card if there is a danger that the magnetic information is illegally obtained when the first card is taken in, and quickly takes in the first card by continuously transports it if there is no danger that the magnetic information is illegally obtained. The second card can be quickly taken in from the beginning without intermittently transporting it. On the other hand, setting the second position to a limit position, where there is a danger that the magnetic information on the first card is illegally obtained, reduces the card ejection time by continuously transporting the first card if there is no danger that the magnetic information is illegally obtained when the first card is ejected, and prevents information from being obtained illegally by intermittently transporting the first card if there is a danger that the magnetic information is illegally obtained. The second card can be quickly ejected from the beginning without intermittently transporting it.

The present invention comprises transportation means for transporting first and second cards; reception means for receiving a type of a card from a higher-level device; and control means for controlling the transportation means according to the type of the card received by the reception means. The reception means receives the type of a card from the higher-level device before the card is taken into a main body of the card processing device. The control means controls the transportation means in such a way that, if the type of the card received by the reception means is the first card, the transportation means takes in the first card by intermittently transporting the first card and, if the type of the card received by the reception means is the second card, the transportation means takes in the second card by continuously transporting the second card.

Thus, the card processing device side knows the type of a card in advance before taking in the card. Therefore, the card processing device can prevent the card information from being obtained illegally from the first card by taking in the first card that is intermittently transported immediately after it is inserted, and can quickly take in the second card by continuously transporting the second card immediately after it is inserted.

The present invention comprises transportation means for transporting first and second cards; detection means, provided near a card insertion slot, for detecting a type of a card; and control means for controlling the transportation means according to the type of the card acquired by the detection means. The control means acquires the type of the card from the detection means before the card is taken into a main body of the card processing device and controls the transportation means in such a way that, if the acquired type of the card is the first card, the transportation means takes in the first card by intermittently transporting the first card and, if the acquired type of the card is the second card, the transportation means takes in the second card by continuously transporting the second card.

In this case, too, the card processing device side knows the type of a card in advance before taking in the card. Therefore, the card processing device can prevent the card information from being obtained illegally from the first card by taking in the first card that is intermittently transported immediately after it is inserted, and can quickly take in the second card by continuously transporting the second card immediately after it is inserted.

When the reception means and the detection means described above are provided, the transportation means intermittently transports the card when the first card is ejected, and continuously transports the card when the second card is ejected. This allows the second card to be quickly ejected while preventing the card information of the first card from being obtained illegally.

The present invention can be applied not only when the type of a card is known before taking in the card as described above but also when the type of a card is not known before taking in the card. In this case, a card processing device comprises first reading means for reading recorded information of the first card that is taken in; second reading means for reading recorded information of the second card that is taken in; transportation means for transporting the first and second cards; and control means for controlling the transportation means according to a type of a card. The first and second reading means are provided in the main body of the device. The first reading means is, for example, a magnetic head that reads information recorded in a magnetic stripe, and the second reading means is an antenna that communicates, for example, with a contactor contacting an IC terminal in a contact IC card or with an antenna of a non-contact IC card. When a card is taken in, the control means controls the transportation means in such a way that, for both the first and second cards, the card is taken in by intermittently transporting the card and, at the same time, determines the type of the card that is taken in based on a reading result of the first reading means or the second reading means. When a card is ejected, the control means controls the transportation means in such a way that the first card is ejected by intermittently transporting the first card, and the second card is ejected by continuously transporting the second card, according to the determined type of the card.

In this configuration, when a card is taken in, the second card is also intermittently transported in the same way as the first card and, therefore, the take-in time of the second card becomes long; however, when the card is ejected, the second card can be ejected quickly while preventing the card information of the first card from being obtained illegally because the type of the card is determined once it is taken in.

In an embodiment of the present invention, it is also possible that, when the first card is exposed outside the main body of the card processing device, the card is intermittently transported and, when the first card is not exposed outside the main body of the card processing device, the card is continuously transported. As described above, when a fake reader is installed on the front of a real card processing device, there is a possibility that the magnetic information of the first card is obtained illegally if the card is exposed outside the main body of the card processing device. There is no possibility that the magnetic information of the first card is obtained illegally if the card is not exposed outside the main body of the card processing device. Therefore, intermittently transporting the card when the card is exposed as described above reliably prevents the magnetic information of the first card from being obtained illegally.

By intermittently transporting a card on which magnetic information is recorded and continuously transporting a card on which magnetic information is not recorded, the present invention can provide a card processing device capable of quickly processing a card other than a magnetic card while preventing the card information of the magnetic card from being obtained illegally.

BEST MODE FOR CARRYING OUT THE INVENTION

Figure 1:
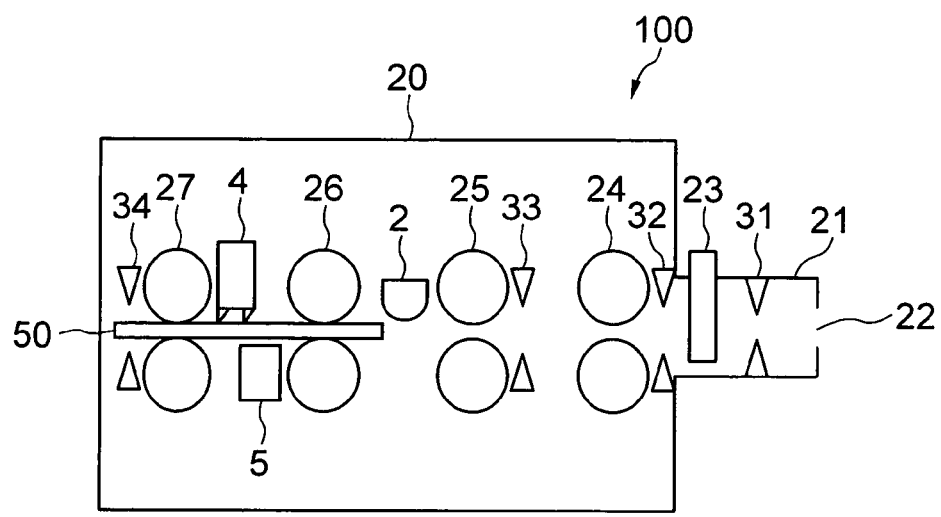
FIG. 1 is a diagram showing the general structure of a card processing device in an embodiment of the present invention.
Figure 2:
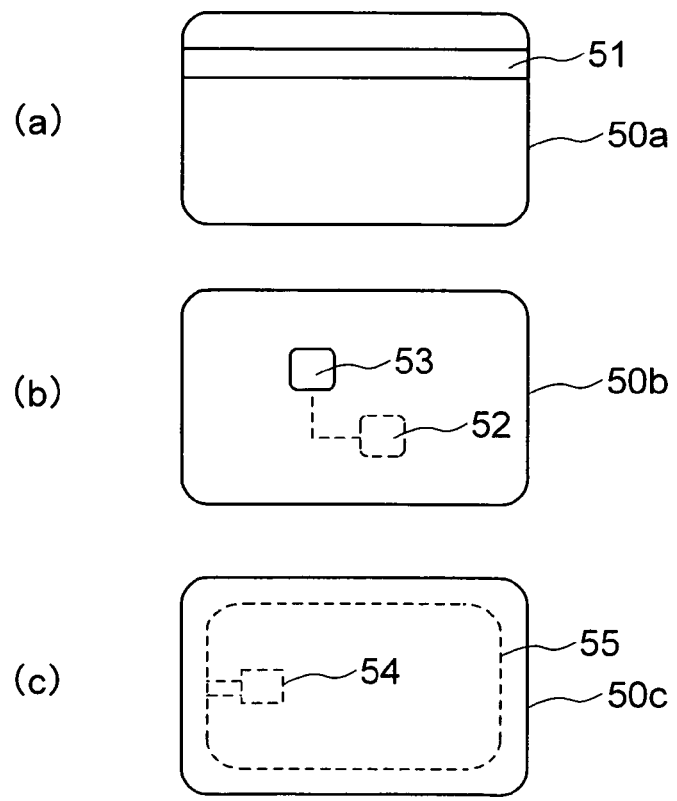
FIG. 2 is a diagram showing a magnetic card, a contact IC card, and a non-contact IC card.

FIG. 1 is a diagram showing the general structure of a card processing device in an embodiment of the present invention. Referring to FIG. 1, the numeral 100 is a card processing device mounted, for example, on an ATM. The numeral 50 is a card processed by the card processing device 100. This card may be one of a magnetic card 50*a* with a magnetic stripe 51 such as the one shown in FIG. 2(*a*), a contact IC card 50*b* with an IC chip 52 and an IC terminal 53 such as the one shown in FIG. 2(*b*), and a non-contact IC card 50*c* with an IC chip 54 and an antenna 55 such as the one shown in FIG. 2(*c*). As just described, the card processing device 100 is a device capable of processing both the magnetic card 50*a* on which magnetic information is recorded and the IC cards 50*b* and 50*c* on which magnetic information is not recorded. The cards 50a-50c are of almost the same size.

The numeral 20 is the main body of the card processing device 100, the numeral 21 is a card insertion unit provided in the front side of the main body 20, and the numeral 22 is a card insertion slot through which the card 50 is inserted. The numeral 23 is a shutter that is opened and closed in the upward and downward directions in the figure by a solenoid that will be described later. This shutter controls the entry of the card 50 from the card insertion slot 22 to the inside of the main body 20 or the ejection of the card 50 from the inside of the main body 20 to the card insertion slot 22. The numerals 24-27 are roller pairs, each composed of a top roller and a bottom roller, that transport the card 50 into the right and left directions in the figure through the forward/backward rotation of a motor that will be described later. The numerals 31-34 are card detection sensors (hereinafter simply called "sensors"). The sensor 31 is provided between the card insertion slot 22 and the shutter 23 in the card insertion unit 21, and the sensors 32-34 are provided inside the main body 20. Each of the sensors 31-34 comprises a photo micro-sensor having a pair of a floodlight element and a photo acceptance element at the top and at the bottom.

The numeral 2 is a magnetic head that reads magnetic information from the magnetic stripe 51 when the card 50 is the magnetic card 50a. When the magnetic card 50a is transported by the rollers 24-27, the magnetic head 2 detects a change in the magnetic force in the magnetic stripe 51 to read the magnetic information. The numeral 4 is a contact block that comes into contact with the IC terminal 53 to read information from the IC chip 52 when the card 50 is the contact IC card 50b. This contact block 4 can be moved up and down by the solenoid that will be described later. The numeral 5 is an antenna that communicates wirelessly with the antenna 55 on a card side to read information from the IC chip 54 when the card 50 is the non-contact IC card 50c.

Figure 3:
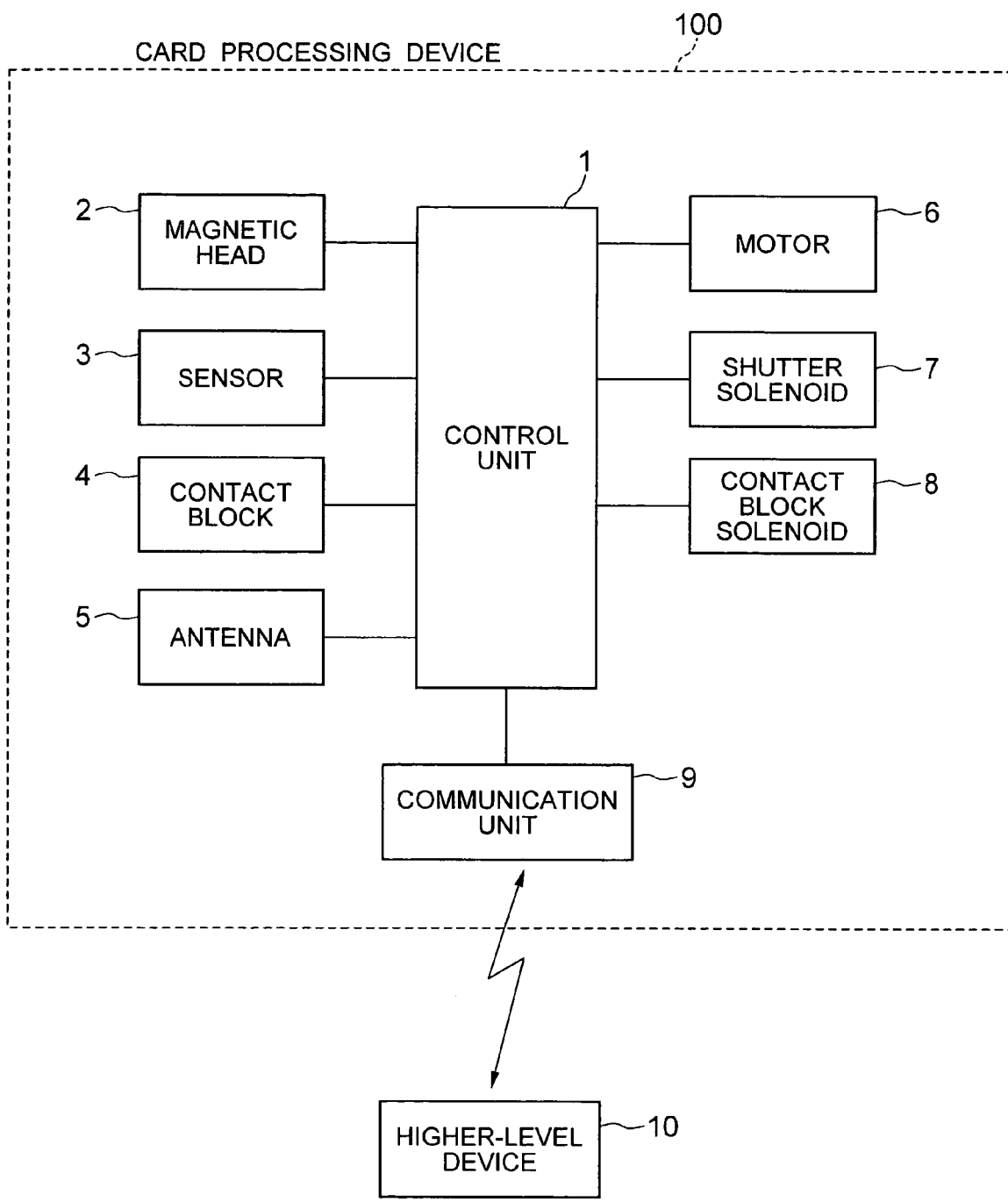
FIG. 3 is a block diagram showing the electrical configuration of the card processing device.

FIG. 3 is a block diagram showing the electrical configuration of the card processing device 100. Referring to FIG. 3, the numeral 1 is a control unit that controls the components of the card processing device 100. The control unit 1 comprises a CPU, a ROM, a RAM, and control circuits that will be described later. The programs executed by the CPU are stored in the ROM, while control data used by the CPU to control the components can be read from, and written into, the RAM. The numeral 2 is the magnetic head shown in FIG. 1, the numeral 3 is a sensor generically representing the sensors 31-34 shown in FIG. 1, the numeral 4 is the contact block shown in FIG. 1, and the numeral 5 is the antenna shown in FIG. 1. The numeral 6 is a motor that rotates the rollers 24-27 described above. The control unit 1 has a motor control circuit for controlling the driving of the motor 6. This control circuit drives the motor 6 in the forward and the backward directions, and the motor in turn rotates the rollers 24-27 to transport the card 50 into a predetermined direction. The numeral 7 is a shutter solenoid for opening and closing the above-described shutter 23, and the numeral 8 is a contact block solenoid for moving the above-described contact block 4 up and down. The control unit 1 has a solenoid control circuit for controlling the driving of the solenoids 7 and 8. This control circuit drives the solenoids 7 and 8 to open/close the shutter 23 or to move the contact block 4 up and down. The numeral 9 is a communication unit for communication with a higher-level device 10. The higher-level device 10 is, for example, an ATM on which the card processing device 100 is mounted. The control unit 1 sends the information read by the magnetic head 2 from the magnetic card 50a, the information read by the contact block 4 from the contact IC card 50b, and the information read by the antenna 5 from the non-contact IC card 50c, to the higher-level device 10 via the communication unit 9.

In the configuration described above, the control unit 1 constitutes one embodiment of control means in the present invention. The magnetic head 2 constitutes one embodiment of first reading means in the present invention, and the contact block 4 and the antenna 5 constitute one embodiment of second reading means in the present invention. The motor 6 and the rollers 24-27 constitute one embodiment of transport means in the present invention. The communication unit 9 constitutes one embodiment of reception means in the present invention. The magnetic card 50a constitutes one embodiment of a first card in the present invention, and the contact IC card 50b and the non-contact IC card 50c constitute one embodiment of a second card in the present invention.

Figure 4:
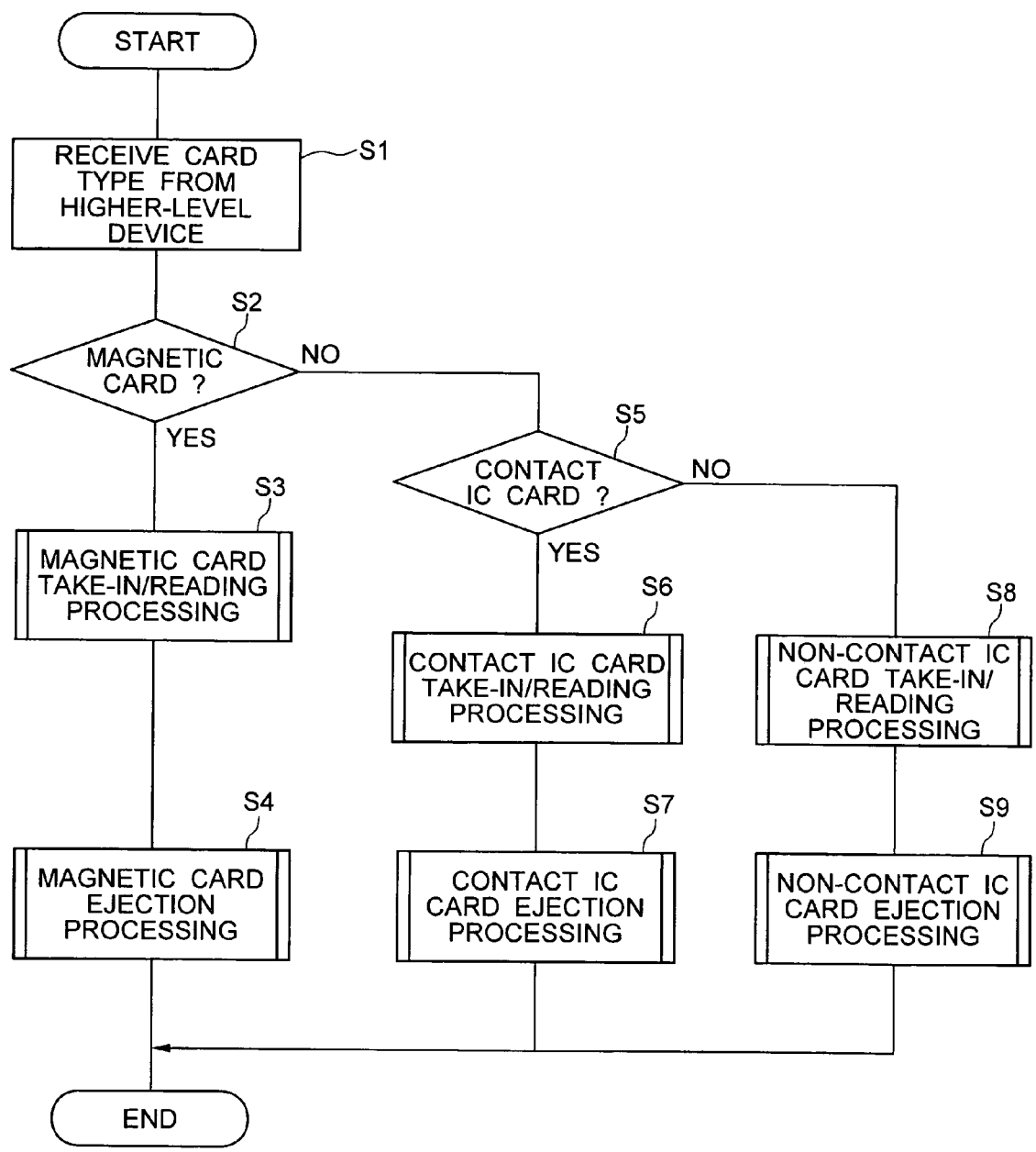
FIG. 4 is a flowchart showing the general operation of the card processing device.
Figure 8:
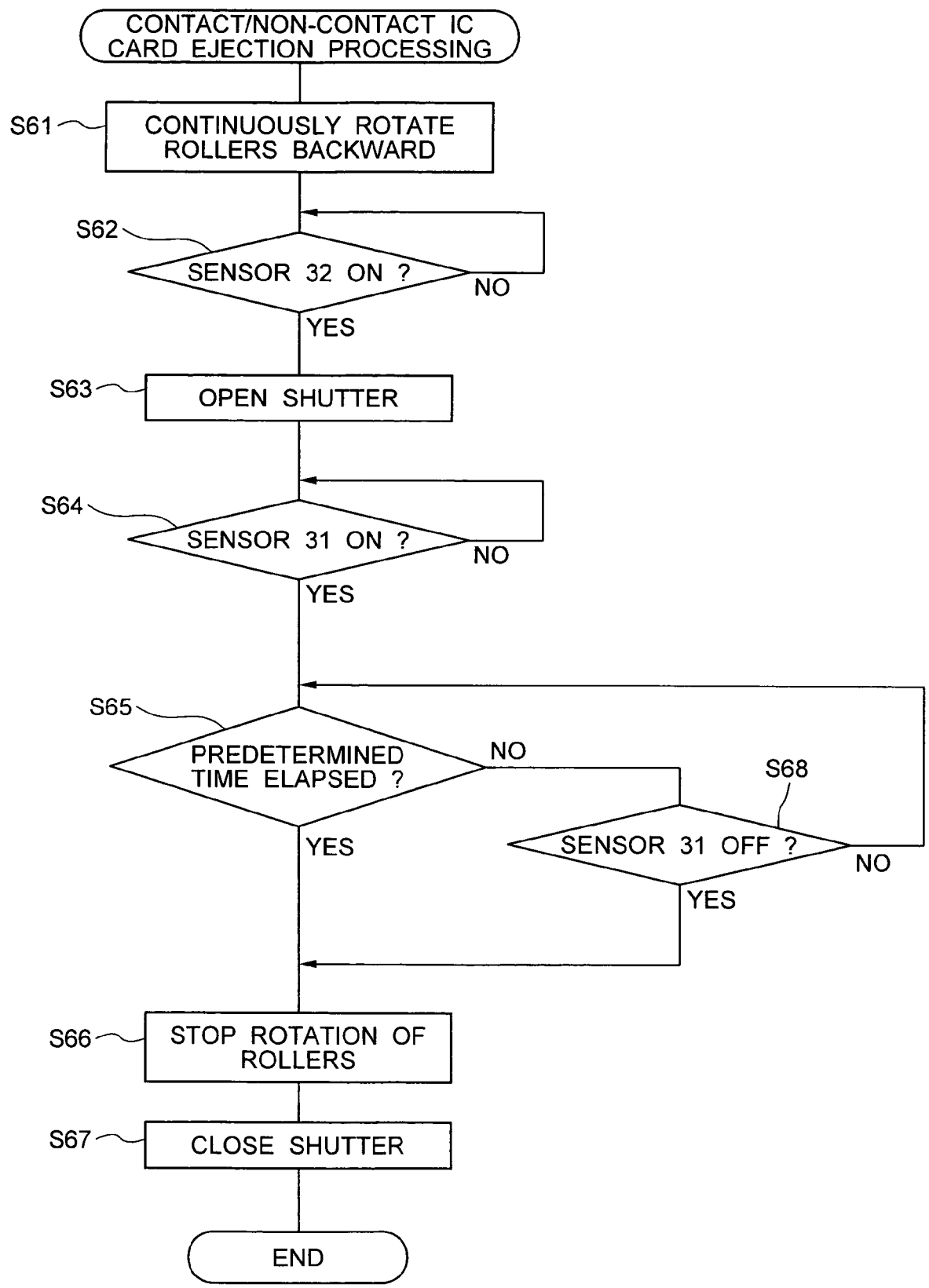
FIG. 8 is a flowchart showing the detailed procedure of the ejection processing of a contact/non-contact IC card.
Figure 9:
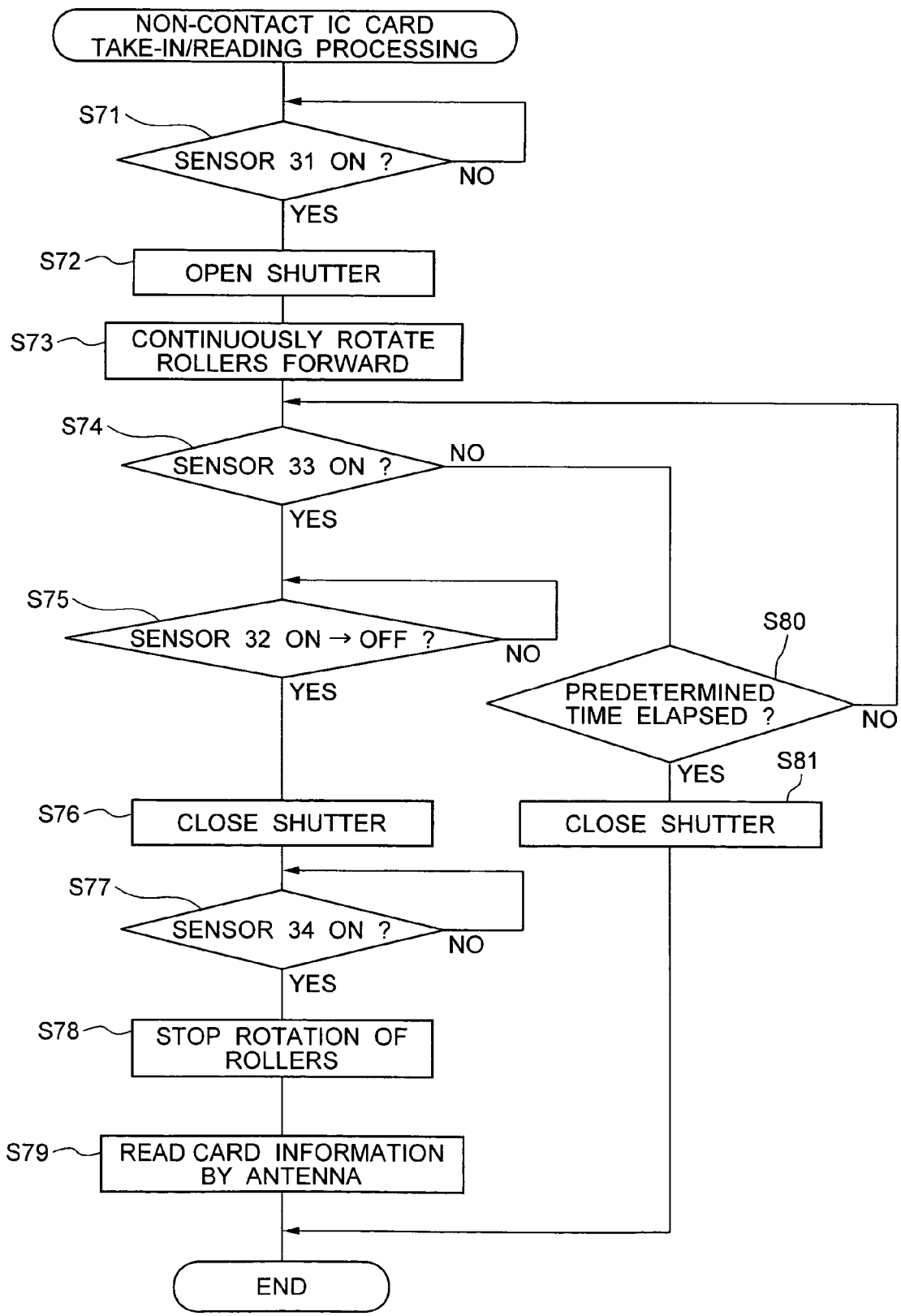
FIG. 9 is a flowchart showing the detailed procedure of the take-in/reading processing of a non-contact IC card.
Figure 10A:
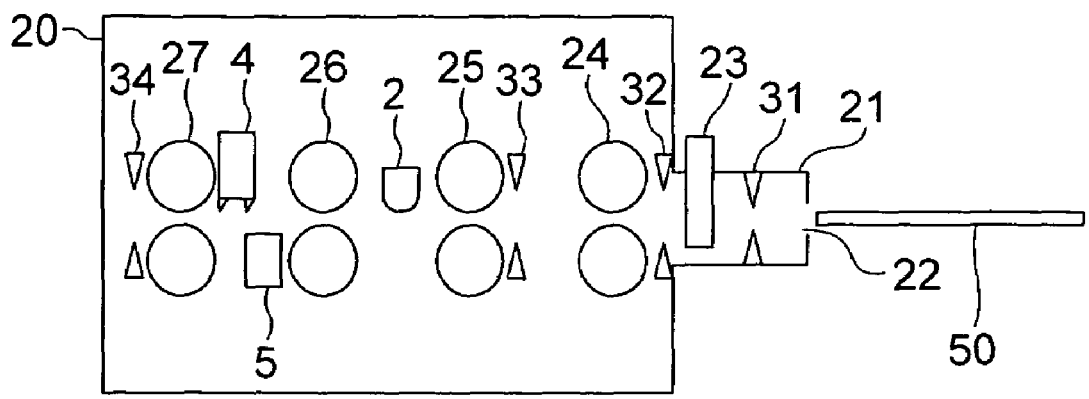
FIG. 10A is a diagram showing the transport state of a card.
Figure 10A:
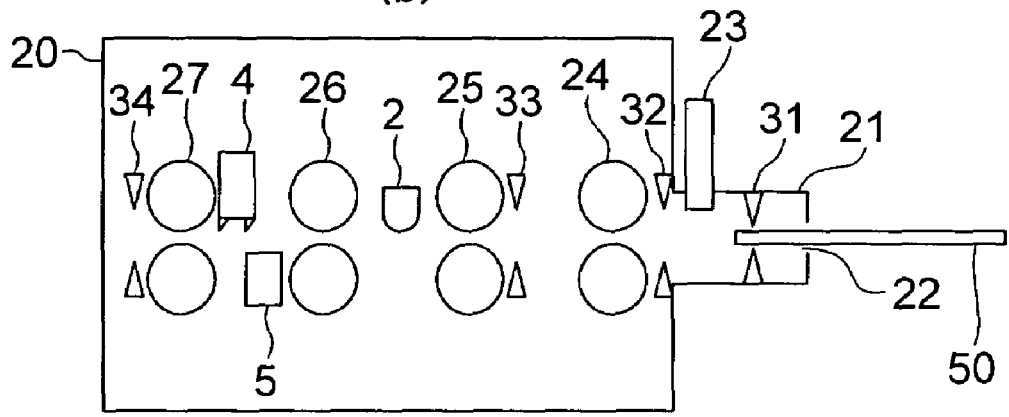
Figure 10A:
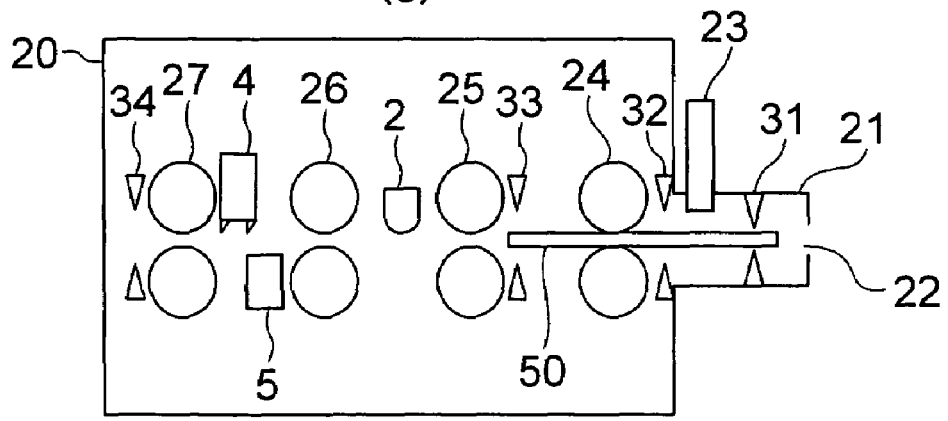
Figure 10B:
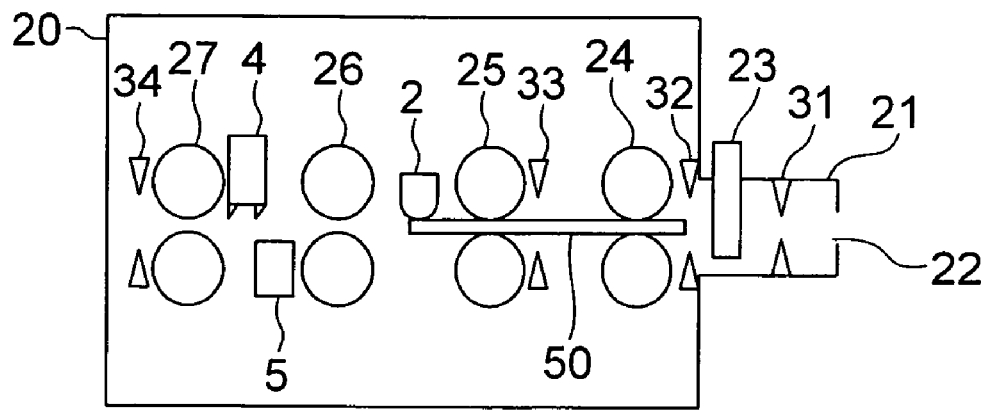
FIG. 10B is a diagram showing the transport state of a card.
Figure 10B:
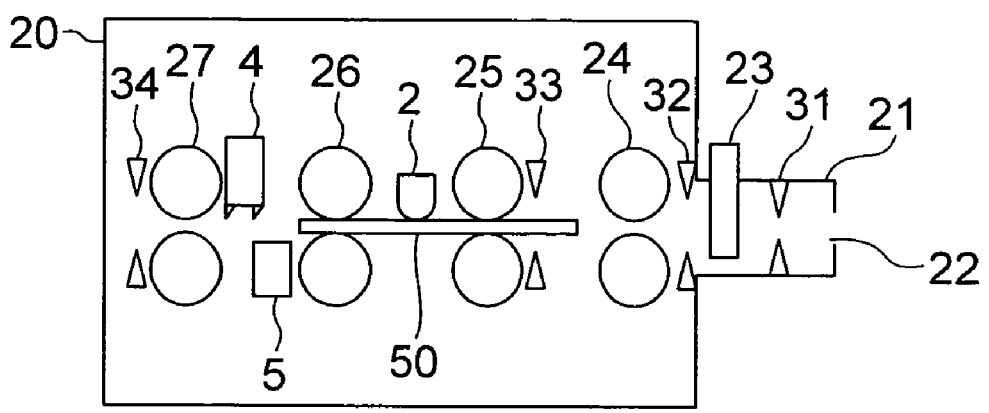
Figure 10B:
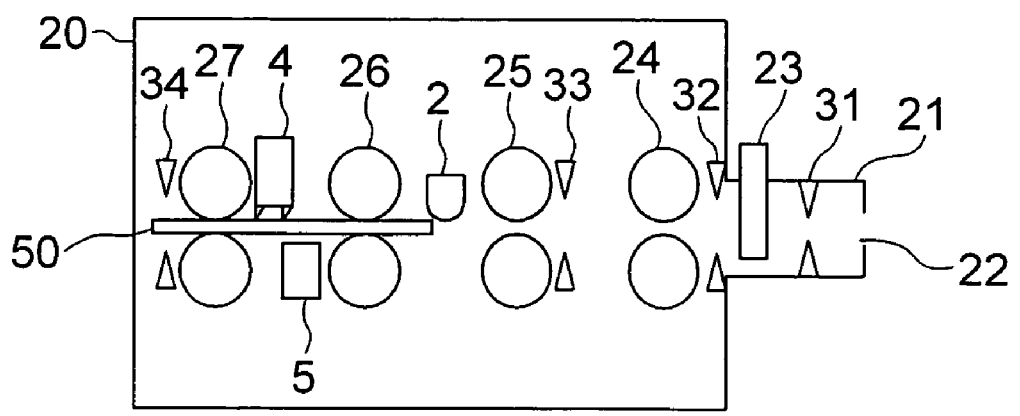
Figure 10C:
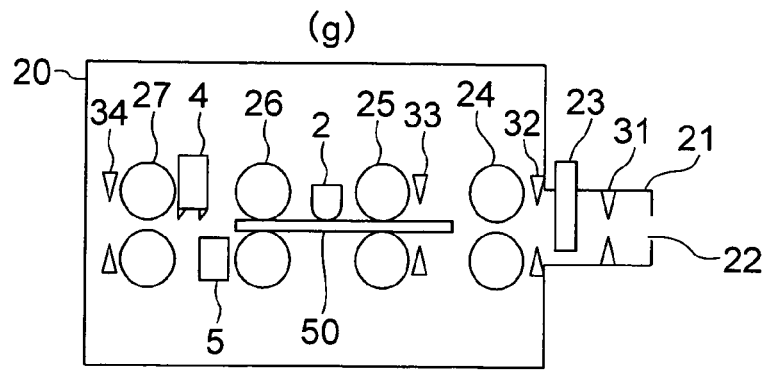
FIG. 10C is a diagram showing the transport state of a card.
Figure 10C:
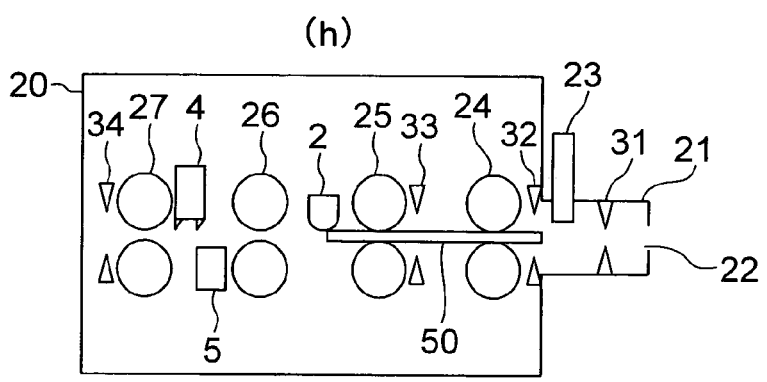
Figure 10C:
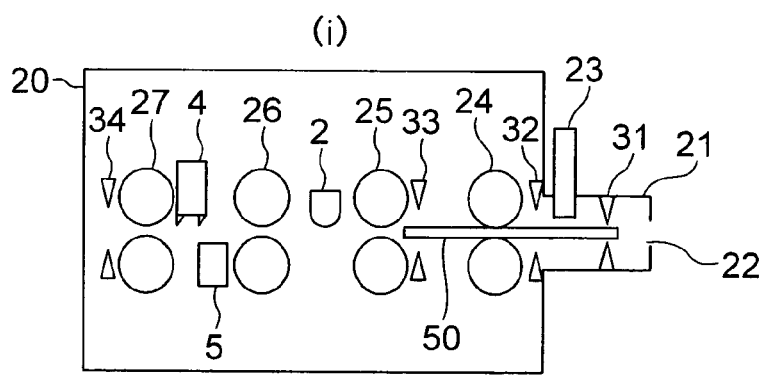
Figure 10C:
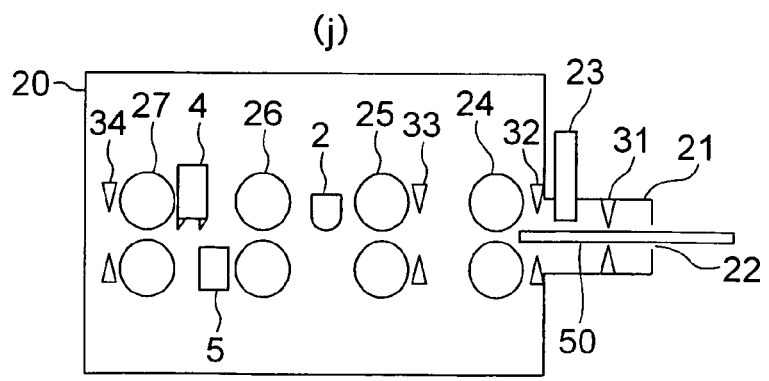

FIG. 4 to FIG. 9 are flowcharts showing the operating procedure of the card processing device 100. The processing steps are executed by the CPU in the control unit 1. FIG. 4 shows the general operation of the whole device, and FIGS. 5-9 show the detailed procedures of the parts. FIGS. 10A-10C are diagrams showing the card transport state in the card processing device 100. The following describes the operation of the card processing device 100 with reference to those figures.

First, the following describes the general operation of the whole device with reference to FIG. 4. In the description below, assume that the higher-level device 10 is an ATM and the card processing device 100 is mounted on this ATM. When the user performs a predetermined operation on the customer panel to carry out a transaction on the ATM using the card 50, the higher-level device 10 sends the transaction start signal to the communication unit 9 of the card processing device 100 to cause the card processing device 100 to start the card processing. First, the communication unit 9 receives the information on the type of the card sent from the higher-level device 10 (step S1). The information on the card type, specified by the user on the customer panel, is sent from the higher-level device 10 to the communication unit 9 as a code signal. In this embodiment, the information on the card type is sent from the higher-level device 10 to the card processing device 100 before the card 50 is taken in, the card processing device 100 side knows the type of the card in advance. Next, the card processing device decodes the type of the received card to determine if the card is a magnetic card (step S2). If the card is a magnetic card (step S2: YES), control is passed to step S3 to perform the magnetic card take-in/reading processing and, after this processing is finished, the device performs the magnetic card ejection processing (step S4). Steps S3 and S4 will be described later in detail.

If it is found in step S2 that the card is not a magnetic card (step S2: NO), then the device checks if the card is a contact IC card (step S5). If the card is a contact IC card (step S5: YES), control is passed to step S6 to perform the contact IC card take-in/reading processing and, after this processing is finished, the device performs the contact IC card ejection processing (step S7). Steps S6 and S7 will be described later in detail.

If it is found in step S5 that the card is not a contact IC card (step S5: NO), the device determines that the card is a non-contact IC card, performs the non-contact IC card take-in/reading processing (step S8) and, after this processing is finished, performs the non-contact IC card ejection processing (step S9). Steps S8 and S9 will be described later in detail.

Figure 5:
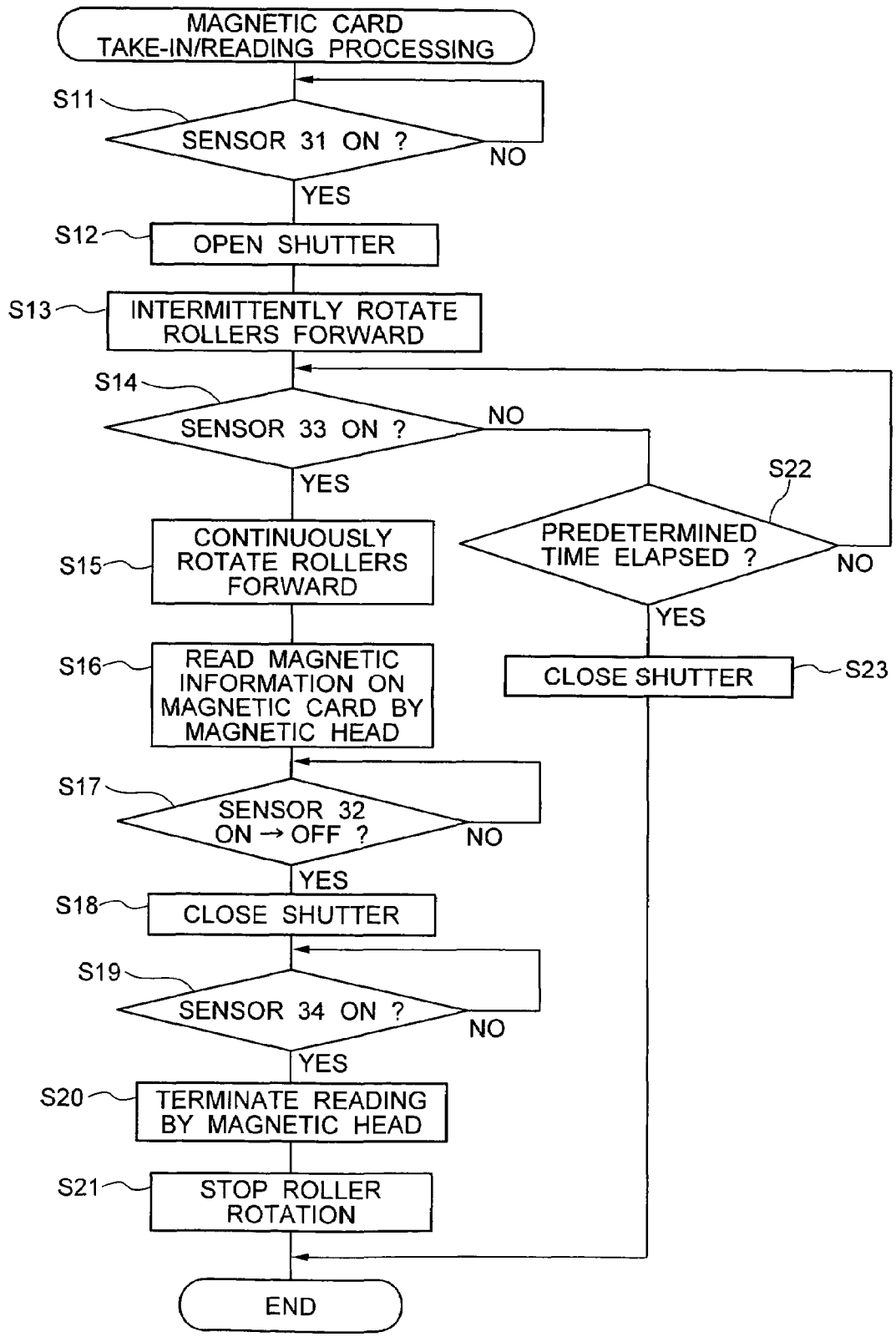
FIG. 5 is a flowchart showing the detailed procedure of the take-in/reading processing of a magnetic card.

FIG. 5 is a flowchart showing the detailed procedure of the magnetic card take-in/reading processing in step S3 in FIG. 4. The following describes this procedure. The control unit 1 constantly monitors if the sensor 31 provided at the card insertion slot 22 is turned ON (step S11). When the user starts inserting the card 50 (magnetic card 50a in this example) into the card insertion slot 22 as shown in FIG. 10A(a) and the card 50 reaches the position of the sensor 31 as shown in FIG. 10A(b), the sensor 31 that senses the card 50 is turned ON (step S11: YES), the shutter solenoid 7 is driven, and the shutter 23 is opened (step S12). After that, the motor 6 is intermittently driven forward, and the rollers 24-27 are also intermittently driven forward by this motor (step S13).

Figure 15:
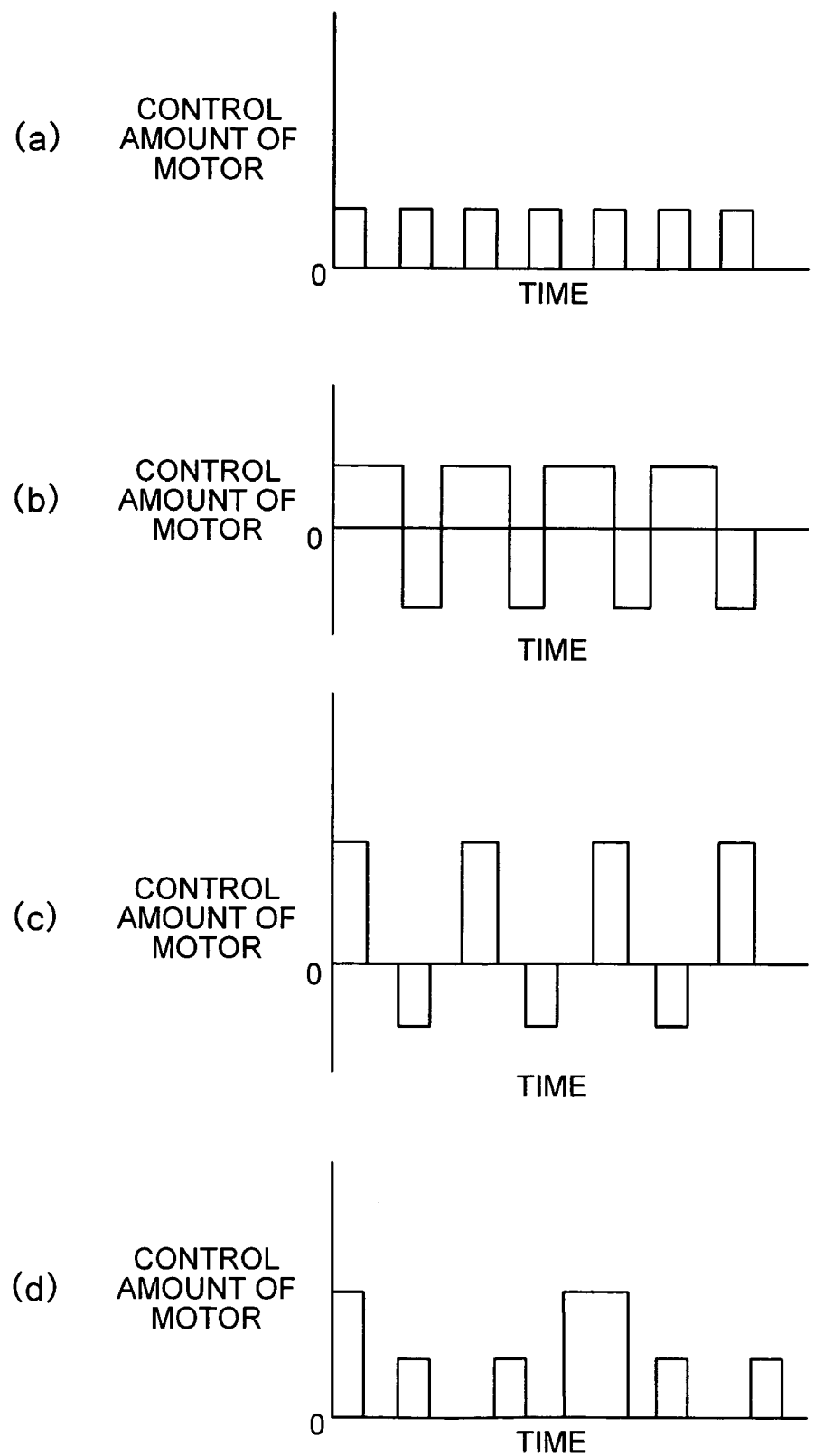
FIG. 15 is a diagram showing an example of the control amount of a motor.
Figure 16:
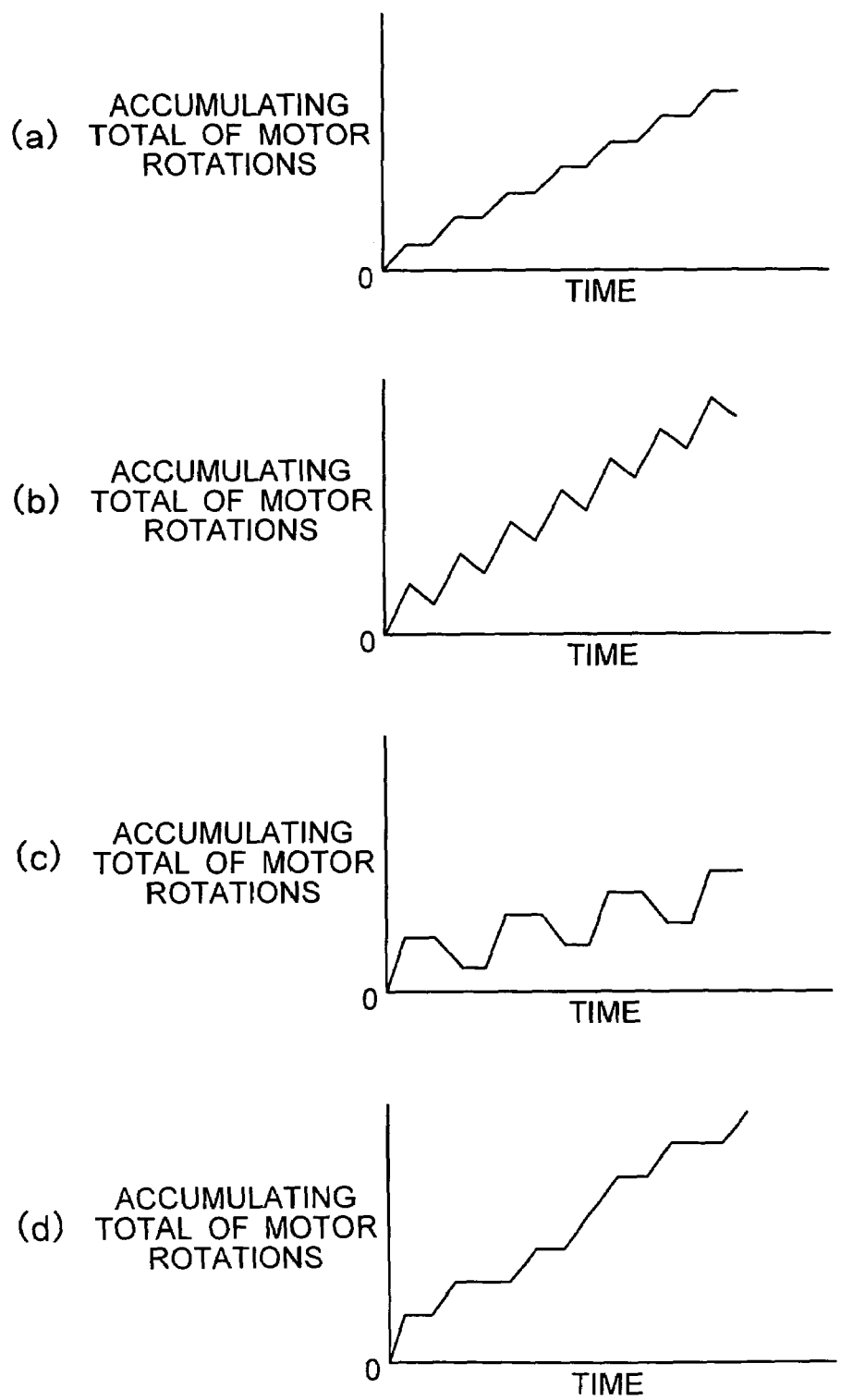
FIG. 16 is a diagram showing the intermittent rotation operation of a motor.

In this case, the control amount (driving voltage) such as the one shown in FIG. 15(a) is supplied from the motor driving circuit in the control unit 1 to the motor 6 to cause the motor 6 to perform the intermittent rotation operation such as the one shown in FIG. 16(a). Referring to FIG. 16(a), the motor 6 rotates one unit of rotation amount per one unit time, stops for the next one unit time, and repeats this operation. As a result, the card 50 whose leading edge (left end) is inserted to the position of the roller 24 is intermittently transported into the left direction in the figure by the roller 24 that rotates intermittently. While the card 50 is inserted to the position of the roller 24, the sensor 32 is turned ON.

Next, the control unit checks if the sensor 33 is turned ON (step S14). When the card 50 is transported to the position of the sensor 33 as shown in FIG. 10A(c), the sensor 33 that senses the card 50 is turned ON (step S14: YES) and, in response to this, the driving of the motor 6 is changed from the intermittent driving to the continuous driving to cause the motor 6 to be continuously driven forward. This also causes the rollers 24-27 to be continuously rotated forward (step S15). As a result, the card 50 is transported continuously into the left direction in the figure by the continuously rotating rollers 24 and 25 and is taken into the main body 20. When the card 50 reaches the position of the magnetic head 2 as shown in FIG. 10B(d), the magnetic head 2 starts reading the magnetic information (information recorded in the magnetic stripe 51) on the card 50 (step S16). Next, the control unit checks if the sensor 32 is changed from ON to OFF (step S17). When the trailing edge (right end) of the card 50 passes the sensor 32 as shown in FIG. 10B(d), the sensor 32 is changed from ON to OFF (step S17: YES) and, in response to this, the shutter solenoid 7 closes the shutter 23 (step S18).

After that, the card 50 is continuously transported by the rollers 25 and 26 as shown in FIG. 10B(e) and, while the card is being transported, the magnetic information on the card 50 is read by the magnetic head 2. On the other hand, the control unit 1 checks if the sensor 34 is turned ON (step S19). When the card 50 is transported to the position of the sensor 34 as shown in FIG. 10B(f), the sensor 34 that senses the card 50 is turned ON (step S19: YES) and, in response to this, the magnetic head 2 terminates reading the magnetic information (step S20). When the sensor 34 is turned ON, the control unit 1 determines that the card 50 is transported to the back of the card processing device 100 and stops the motor 6. This also stops the rotation of the rollers 24-27 (step S21).

If the sensor 33 is not turned ON in step S14 (step S14: NO), the control unit checks if a predetermined time has elapsed since the sensor 31 was turned ON (step S22). If the predetermined time has not yet elapsed (step S22: NO), control is returned to step. S14 to monitor the state of the sensor 33. If the sensor 33 is not turned ON (step S14: NO) and the predetermined time has elapsed (step S22: YES), it is determined that the card 50 is not taken into the main body 20. The shutter solenoid 7 closes the shutter 23 (step S23) to terminate the processing.

As described above, when the card 50 (magnetic card 50a) is taken into the main body 20 of the card processing device according to the procedure shown in FIG. 5, the card 50 inserted from the card insertion slot 22 is transported intermittently first and, after the card 50 reaches the position of the sensor 33 (first position of the present invention) inside the main body 20, is transported continuously. Note that the sensor 33 is positioned in the limit position where there is no danger that the magnetic information on the card 50 is illegally obtained; that is, the sensor 33 is positioned in the leading-edge (left end) position of the card that is taken into the main body 20 deeply enough that the fake reader, mounted on the card insertion unit 21, cannot normally obtain the magnetic information on the card 50. This configuration makes it possible that the card 50 is transported intermittently to prevent the magnetic information from being obtained illegally when there is a danger that the magnetic information is illegally obtained and that the card 50 is transported continuously to quickly take the card 50 into the device when there is no danger that the magnetic information is illegally obtained.

After stopping the driving of the motor 6, the control unit 1 sends the information, read from the card 50 by the magnetic head 2, to the higher-level device 10 via the communication unit 9. The higher-level device 10 performs predetermined transaction processing (for example, cash withdrawal) based on the received card information. When the transaction processing is finished, the higher-level device 10 notifies the end of processing to the card processing device 100. When the communication unit 9 receives this notification, the control unit 1 performs the ejection processing (step S4 in FIG. 4) of the card 50 according to the procedure described below.

Figure 6:
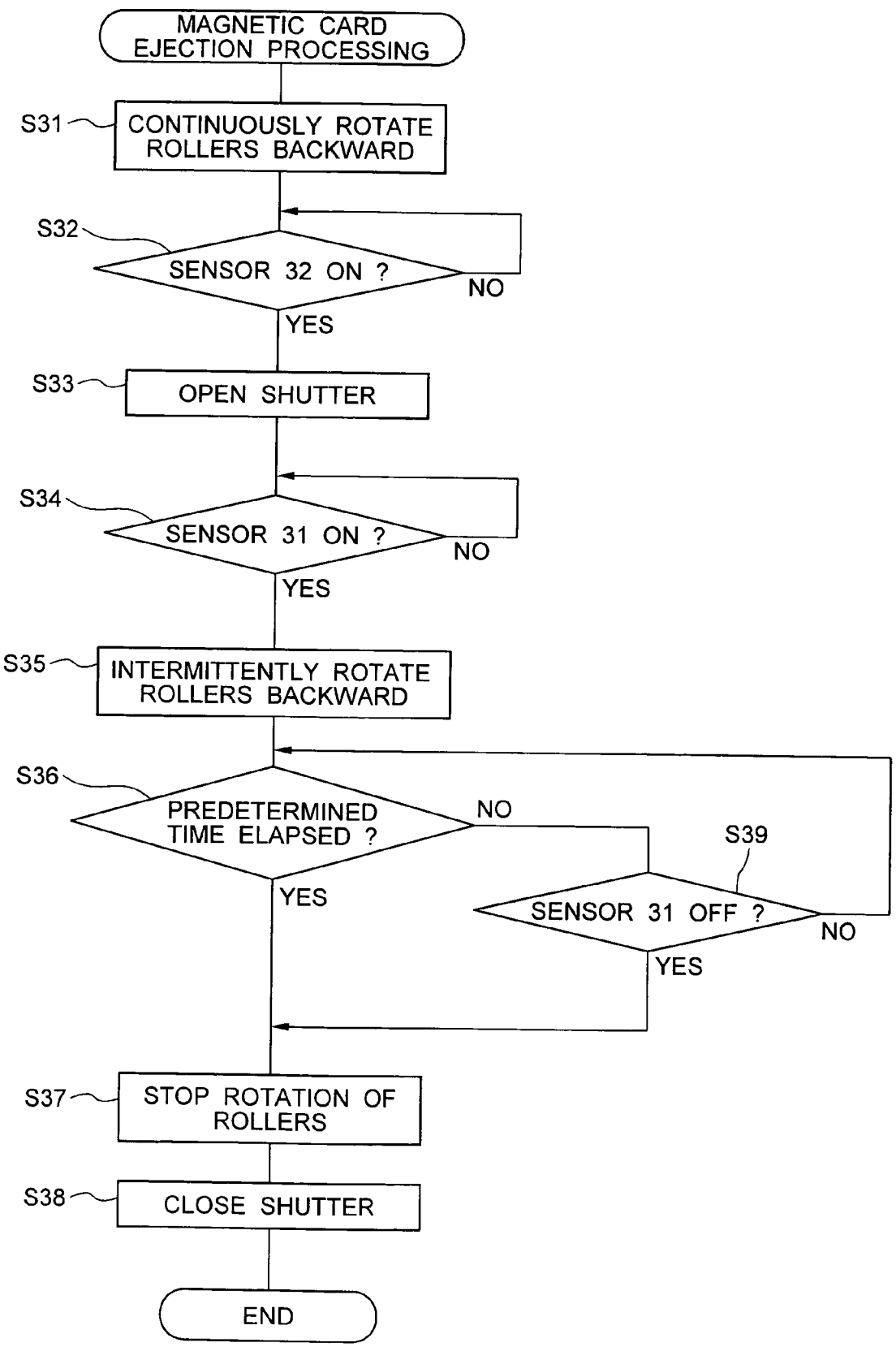
FIG. 6 is a flowchart showing the detailed procedure of the ejection processing of a magnetic card.

FIG. 6 is a flowchart showing the detailed procedure of the ejection processing of a magnetic card in step S4 in FIG. 4. When the ejection processing is started, the control unit 1 continuously drives the motor 6 backward to continuously rotate the rollers 24-27 backward (step S31). The rollers 24-27, which are rotated backward, continuously transport the card 50, which is in the position shown in FIG. 10B(f), into the right direction as shown in FIG. 10C(g). Next, the control unit checks if the sensor 32 is turned ON (step S32). When the leading edge (right end) of the card 50 reaches the position of the sensor 32 as shown in FIG. 10C(h), the sensor 32 that senses the card 50 is turned ON (step S32: YES) and, in response to this, the shutter solenoid 7 opens the shutter 23 (step S33). This causes the card 50 to be transported toward the card insertion slot 22.

After the shutter 23 is opened, the control unit 1 checks if the sensor 31 is turned ON (step S34). When the card 50 is transported to the position of the sensor 31 as shown in FIG. 10C(i), the sensor 31 that senses the card 50 is turned ON (step S34: YES). In response to the change in the sensor 31 that is turned ON, the driving of the motor 6 is switched from the continuous driving to the intermittent driving and the motor 6 is intermittently driven backward. This also causes the rollers 24-27 to be intermittently rotated backward (step S35). As a result, the card 50 is intermittently transported by the intermittently rotating roller 24 into the right direction in the figure and is ejected out of the device from the card insertion slot 22 as shown in FIG. 10C(j). In this case, the motor 6 is driven in the same way as in FIG. 15(a) and FIG. 16(a) described above.

After the intermittent rotation of the rollers is started in step S35, the control unit 1 monitors if a predetermined time has elapsed since the sensor 31 was turned ON (step S36). If the predetermined time has not yet elapsed (step S36: NO), the control unit checks if the sensor 31 is turned OFF (step S39). If the user removes the card 50, ejected from the card insertion slot 22, by the time the predetermined time has elapsed, the sensor 31 is turned OFF (step S39: YES). When the sensor 31 is turned OFF, the control unit 1 determines that the card 50 is removed and stops the driving of the motor 6. This stops the rotation of the rollers 24-27 (step S37). After that, the shutter 23 is closed (step S38) and the processing is terminated. Also, if the sensor 31 is not turned OFF in step S39 (step S39: NO) and the predetermined time has elapsed (step S36: YES), the rotation of the rollers 24-27 is stopped (step S37), the shutter 23 is closed (step S38), and the processing is terminated. Thus, the sequence of transaction processing on the ATM using the card 50 is completed.

As described above, when the card 50 (magnetic card 50a) is ejected out of the main body 20 of the card processing device according to the procedure in FIG. 6, the card 50 is continuously transported until the card 50 is transported to the position (second position of the present invention) of the sensor 31 provided near the card insertion slot 22 and, after the card 50 is transported to the position of the sensor 31, the card 50 is transported intermittently. Note that the sensor 31 is positioned in the limit position where there is a danger that the magnetic information on the card 50 is illegally obtained; that is, the sensor 31 is positioned in the leading-edge (right end) position of the card that is ejected out of the main body 20 to such an extent that the fake reader, mounted on the card insertion unit 21, can normally obtain the magnetic information on the card 50. This configuration makes it possible that the card 50 is continuously transported to reduce the time required until the card is ejected when there is no danger that the magnetic information is illegally obtained and that the card 50 is intermittently transported to prevent the magnetic information from being illegally obtained when there is a danger that the magnetic information is illegally obtained.

Figure 7:
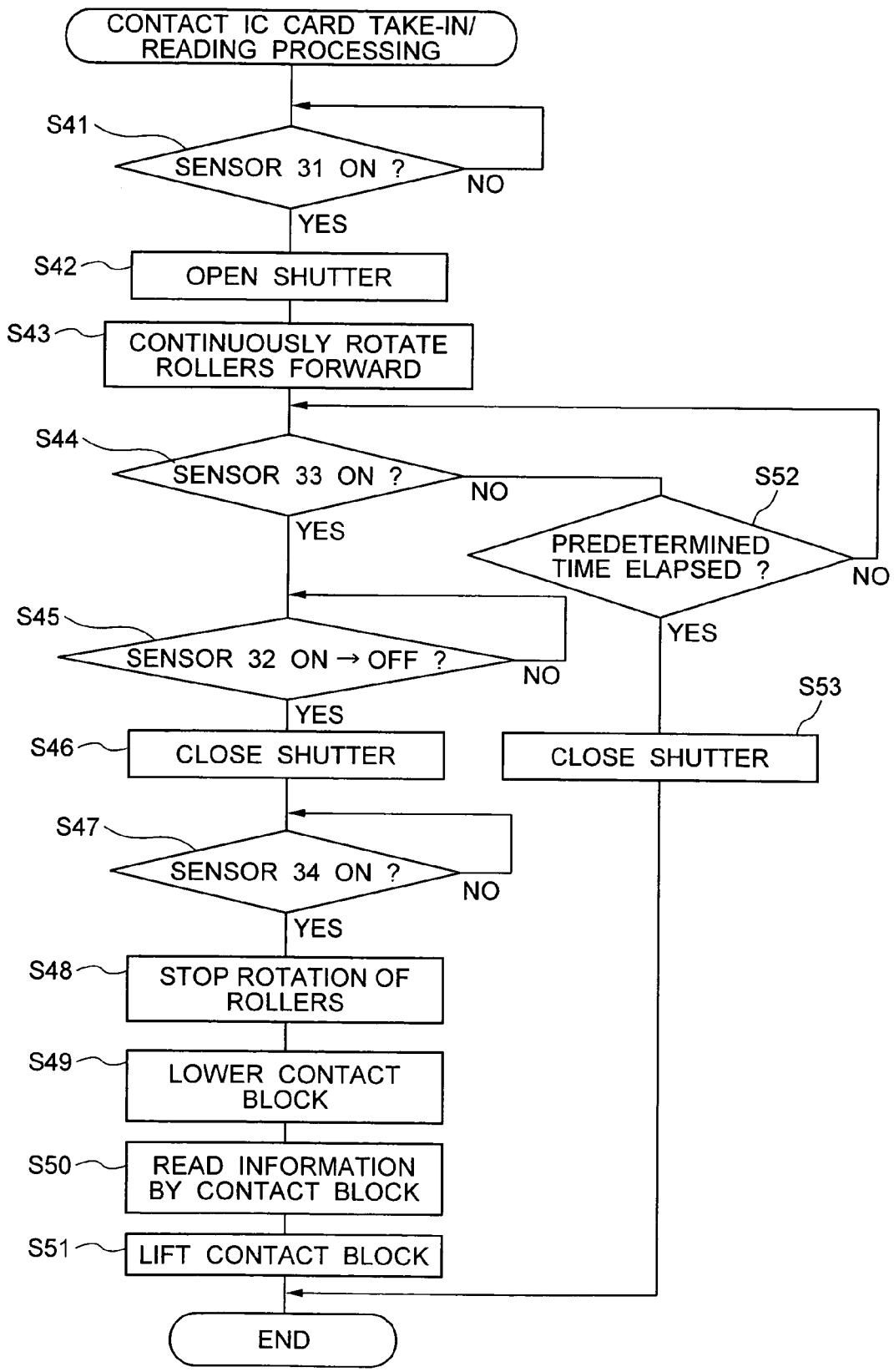
FIG. 7 is a flowchart showing the detailed procedure of the take-in/reading processing of a contact IC card.

Next, the following describes the processing that is performed when the card 50 is the contact IC card 50b. FIG. 7 is a flowchart showing the detailed procedure of the contact IC card take-in/reading processing in step S6 in FIG. 4. The following describes this procedure. The control unit 1 constantly monitors if the sensor 31 provided at the card insertion slot 22 is turned ON (step S41). When the user starts inserting the card 50 (contact IC card 50b in this example) into the card insertion slot 22 as shown in FIG. 10A(a) and the card 50 reaches the position of the sensor 31 as shown in FIG. 10A(b), the sensor 31 that senses the card 50 is turned ON (step S41: YES), the shutter solenoid 7 is driven, and the shutter 23 is opened (step S42). After that, the motor 6 is continuously driven forward and the rollers 24-27 are also continuously rotated forward by this motor (step S43). As a result, the card 50 whose leading edge (left end) is inserted to the position of the roller 24 is continuously transported in the left direction in the figure by the continuously rotating roller 24. While the card 50 is inserted to the position of the roller 24, the sensor 32 is turned ON.

Next, the control unit checks if the sensor 33 is turned ON (step S44). When the card 50 is transported to the position of the sensor 33 as shown in FIG. 10A(c), the sensor 33 that senses the card 50 is turned ON (step S44: YES). Next, the control unit checks if the sensor 32 has changed from ON to OFF (step S45). When the trailing edge (right end) of the card 50 passes the sensor 32 as shown in FIG. 10B(d), the sensor 32 is changed from ON to OFF (step S45: YES) and, in response to this, the shutter solenoid 7 closes the shutter 23 (step S46).

After that, the card 50 is continuously transported by the rollers 25 and 26 as shown in FIG. 10B(e) and the control unit 1 checks if the sensor 34 is turned ON (step S47). When the card 50 is transported to the position of the sensor 34 as shown in FIG. 10B(f), the sensor 34 that senses the card 50 is turned ON (step S47: YES). When the sensor 34 is turned ON, the control unit 1 determines that the card 50 is transported to the back of the card processing device 100 and stops the motor 6. This also stops the rotation of the rollers 24-27 (step S48). After that, the contact block solenoid 8 is driven to lower the contact block 4 (step S49). The contact block 4 has on its bottom a contactor that contacts the IC terminal 53 on the card 50 when the contact block 4 is lowered. This causes the contact block 4 to be electrically connected to the card 50 and the information recorded in the IC chip 52 on the card 50 is read by the contact block 4 (step S50). When the reading is finished, the contact block 4 is lifted (step S51) to move the contactor away from the IC terminal 53 on the card 50.

If the sensor 33 is not turned ON in step S44 (step S44: NO), the control unit checks if a predetermined time has elapsed since the sensor 31 was turned ON (step S52). If the predetermined time has not yet elapsed (step S52: NO), control is returned to step S44 to monitor the state of the sensor 33. If the sensor 33 is not turned ON (step S44: NO) and the predetermined time has elapsed (step S52: YES), it is determined that the card 50 is not taken into the main body 20. The shutter solenoid 7 closes the shutter 23 (step S53) to terminate the processing.

As described above, when the card 50 (contact IC card 50b) is taken in according to the procedure shown in FIG. 7, the card is continuously transported regardless of its position and taken into the main body 20 of the device. A fake reader, if installed in the card insertion unit 21, can read only the magnetic information but not the information recorded in the IC chip 52 on the contact IC card 50b, meaning that there is no danger that the card information is illegally obtained even if the contact IC card 50b is continuously transported and taken in. Therefore, the contact IC card 50b can be taken quickly into the main body 20 of the device.

The control unit 1 sends the information, read from the card 50 by the contact block 4, to the higher-level device 10 via the communication unit 9. The higher-level device 10 performs predetermined transaction processing (for example, cash withdrawal) based on the received card information. When the transaction processing is finished, the higher-level device 10 notifies the card processing device 100 that the processing has been finished. When the communication unit 9 receives this notification, the control unit 1 performs the ejection processing of the card 50 (step S7 in FIG. 4) according to the procedure described below.

FIG. 8 is a flowchart showing the detailed procedure of the ejection processing of a contact IC card in step S7 in FIG. 4. When the ejection processing is started, the control unit 1 continuously drives the motor 6 backward to continuously rotate the rollers 24-27 backward (step S61). The rollers 24-27, which are rotated backward, continuously transport the card 50, which is in the position shown in FIG. 10B(f), into the right direction as shown in FIG. 10C(g). Next, the control unit checks if the sensor 32 is turned ON (step S62). When the leading edge (right end) of the card 50 reaches the position of the sensor 32 as shown in FIG. 10C(h), the sensor 32 that senses the card 50 is turned ON (step S62: YES) and, in response to this, the shutter solenoid 7 opens the shutter 23 (step S63). This causes the card 50 to be transported toward the card insertion slot 22.

After the shutter 23 is opened, the control unit 1 checks if the sensor 31 is turned ON (step S64). When the card 50 is transported to the position of the sensor 31 as shown in FIG. 10C(i), the sensor 31 that senses the card 50 is turned ON (step S64: YES). Next, the control unit 1 monitors if a predetermined time has elapsed since the sensor 31 was turned ON (step S65). If the predetermined time has not yet elapsed (step S65: NO), the control unit checks if the sensor 31 is turned OFF (step S68). If the user removes the card 50, ejected from the card insertion slot 22, by the time the predetermined time has elapsed, the sensor 31 is turned OFF (step S68: YES). When the sensor 31 is turned OFF, the control unit 1 determines that the card 50 is removed and stops the driving of the motor 6. This also stops the rotation of the rollers 24-27 (step S66). After that, the shutter 23 is closed (step S67) and the processing is terminated. Also, if the sensor 31 is not turned OFF in step S68 (step S68: NO) and the predetermined time has elapsed (step S65: YES), the rotation of the rollers 24-27 is stopped (step S66), the shutter 23 is closed (step S67), and the processing is terminated. Thus, the sequence of transaction processing on the ATM using the contact IC card 50b is completed.

When the contact IC card 50b is ejected, the card is continuously transported regardless of its position and is ejected out of the main body 20 of the device as described above according to the procedure in FIG. 8. A fake reader, if installed in the card insertion unit 21, can read only the magnetic information but not the information recorded in the IC chip 52 on the contact IC card 50b, meaning that there is no danger that the card information is illegally obtained even if the contact IC card 50b is continuously transported during the ejection. Therefore, the contact IC card 50b can be ejected quickly.

Next, the following describes the processing that is performed when the card 50 is the non-contact IC card 50c. FIG. 9 is a flowchart showing the detailed procedure of the non-contact IC card take-in/reading processing in step S8 in FIG. 4. The following describes this procedure. The control unit 1 constantly monitors if the sensor 31 provided at the card insertion slot 22 is turned ON (step S71). When the user starts inserting the card 50 (non-contact IC card 50c in this example) into the card insertion slot 22 as shown in FIG. 10A(a) and the card 50 reaches the position of the sensor 31 as shown in FIG. 10A(b), the sensor 31 that senses the card 50 is turned ON (step S71: YES), the shutter solenoid 7 is driven, and the shutter 23 is opened (step S72). After that, the motor 6 is continuously driven forward and the rollers 24-27 are also continuously rotated forward by this motor (step S73). As a result, the card 50 whose leading edge (left end) is inserted to the position of the roller 24 is continuously transported in the left direction in the figure by the continuously rotating roller 24. While the card 50 is inserted to the position of the roller 24, the sensor 32 is turned ON.

Next, the control unit checks if the sensor 33 is turned ON (step S74). When the card 50 is transported to the position of the sensor 33 as shown in FIG. 10A(c), the sensor 33 that senses the card 50 is turned ON (step S74: YES). Next, the control unit checks if the sensor 32 has changed from ON to OFF (step S75). When the trailing edge (right end) of the card 50 passes the sensor 32 as shown in FIG. 10B(d), the sensor 32 is changed from ON to OFF (step S75: YES) and, in response to this, the shutter solenoid 7 closes the shutter 23 (step S76).

After that, the card 50 is continuously transported by the rollers 25 and 26 as shown in FIG. 10B(e), and the control unit 1 checks if the sensor 34 is turned ON (step S77). When the card 50 is transported to the position of the sensor 34 as shown in FIG. 10B(f), the sensor 34 that senses the card 50 is turned ON (step S77: YES). When the sensor 34 is turned ON, the control unit 1 determines that the card 50 is transported to the back of the card processing device 100 and stops the motor 6. This also stops the rotation of the rollers 24-27 (step S78). After that, the antenna 5 on the card processing device 100 side wirelessly communicates with the antenna 55 on the card 50 side and the information recorded in the IC chip 54 on the card 50 is read by the antenna 5 contactlessly (step S79).

If the sensor 33 is not turned ON in step S74 (step S74: NO), the control unit checks if a predetermined time has elapsed since the sensor 31 was turned ON (step S80). If the predetermined time has not yet elapsed (step S80: NO), control is returned to step S74 to monitor the state of the sensor 33. If the sensor 33 is not turned ON (step S74: NO) and the predetermined time has elapsed (step S80: YES), it is determined that the card 50 is not taken into the main body 20. The shutter solenoid 7 closes the shutter 23 (step S81) to terminate the processing.

As described above, when the card 50 (non-contact IC card 50c) is taken in according to the procedure shown in FIG. 9, the card is continuously transported regardless of its position and taken into the main body 20 of the device. A fake reader, if installed in the card insertion unit 21, can read only the magnetic information but not the information recorded in the IC chip 54 on the non-contact IC card 50c, meaning that there is no danger that the card information is illegally obtained even if the non-contact IC card 50c is continuously transported and taken in. Therefore, the non-contact IC card 50c can be taken quickly into the main body 20 of the device.

The control unit 1 sends the information, read from the card 50 by the antenna 5, to the higher-level device 10 via the communication unit 9. The higher-level device 10 performs predetermined transaction processing (for example, cash withdrawal) based on the received card information. When the transaction processing is finished, the higher-level device 10 notifies the card processing device 100 that the processing has been finished. When the communication unit 9 receives this notification, the control unit 1 performs the ejection processing of the card 50 (step S9 in FIG. 4). The ejection processing in this case is exactly the same as that shown in FIG. 8 and, therefore, its description is omitted. Executing the ejection processing according to the procedure shown in FIG. 8 can quickly eject the non-contact IC card 50c.

In the embodiment described above, the higher-level device 10 sends information on the card type to the card processing device 100 before the card 50 is taken in. When the card is the magnetic card 50a, the card is intermittently transported immediately after the card is inserted into the card insertion slot 22 to prevent the card information from being obtained illegally and, after that, the transport is switched to the continuous transport to reduce the card take-in time. When the card is the contact IC card 50b or the non-contact IC card 50c, the card is continuously transported immediately after the card is inserted to take in the card quickly.

Figure 11:
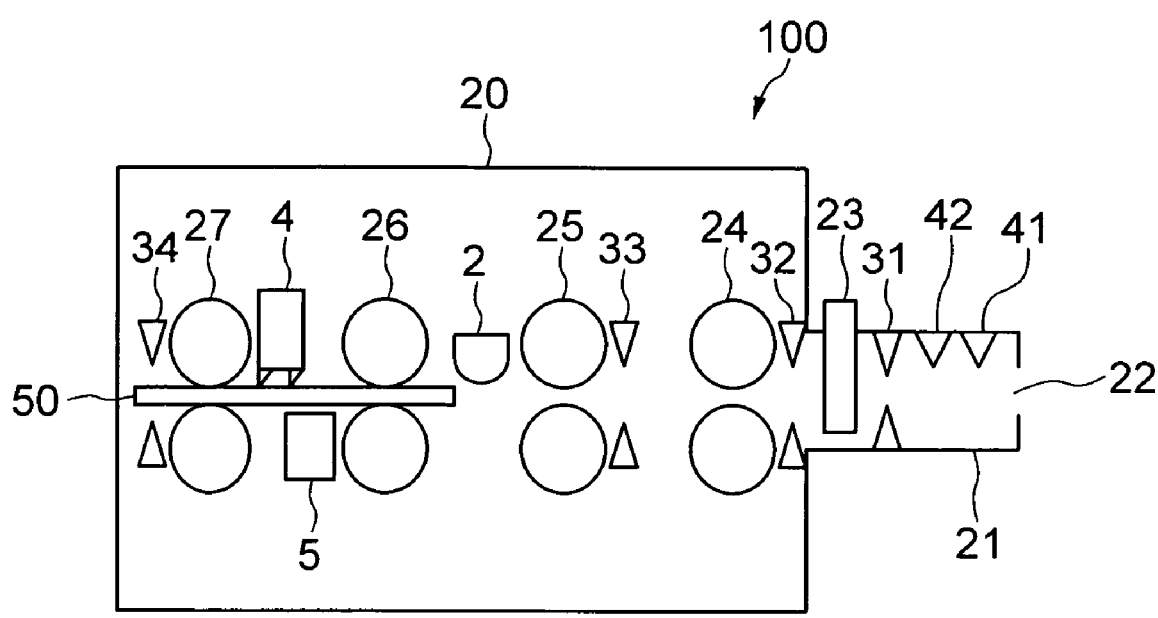
FIG. 11 is a diagram showing the general structure of a card processing device in another embodiment of the present invention.

FIG. 11 is a diagram showing the general structure of a card processing device in another embodiment of the present invention. In FIG. 11, the same reference numerals are used for the corresponding elements of FIG. 1. A card processing device 100 in FIG. 11 differs from that in FIG. 1 in that a card insertion unit 21 has not only a sensor 31 but also a magnetic stripe detection sensor 41 and an IC card detection sensor 42. The other part is the same as that in FIG. 1 and therefore the detailed description is omitted. In this embodiment, instead of receiving the notification of the type of a card from a higher-level device 10 as in the embodiment described above, the sensors 41 and 42 provided in the card processing device 100 determine the type of a card in advance. The magnetic stripe detection sensor 41 and the IC card detection sensor 42 constitute one embodiment of detection means of the present invention.

The magnetic stripe detection sensor 41 comprises a magnetic head. When a card 50 is a magnetic card 50a, the magnetic head reads magnetic information from a magnetic stripe 51 and outputs the read signal; when the card 50 is not the magnetic card 50a, the magnetic head cannot read magnetic information and does not output the read signal. The IC card detection sensor 42 comprises a metal detection sensor. When the card 50 is an IC card (contact IC card 50b or non-contact IC card 50c), the metal detection sensor detects a metal object constituting IC chips 52 and 54, an IC terminal 53, or ah antenna 55 and outputs the detection signal; when the card 50 is not an IC card, the metal detection sensor cannot detect a metal object constituting the IC chips 52 and 54, the IC terminal 53, the antenna 55 and does not output the detection signal. Therefore, the presence of the read signal or detection signal from the sensors 41 and 42 indicates whether the card 50 is a magnetic card or an IC card.

Figure 12:
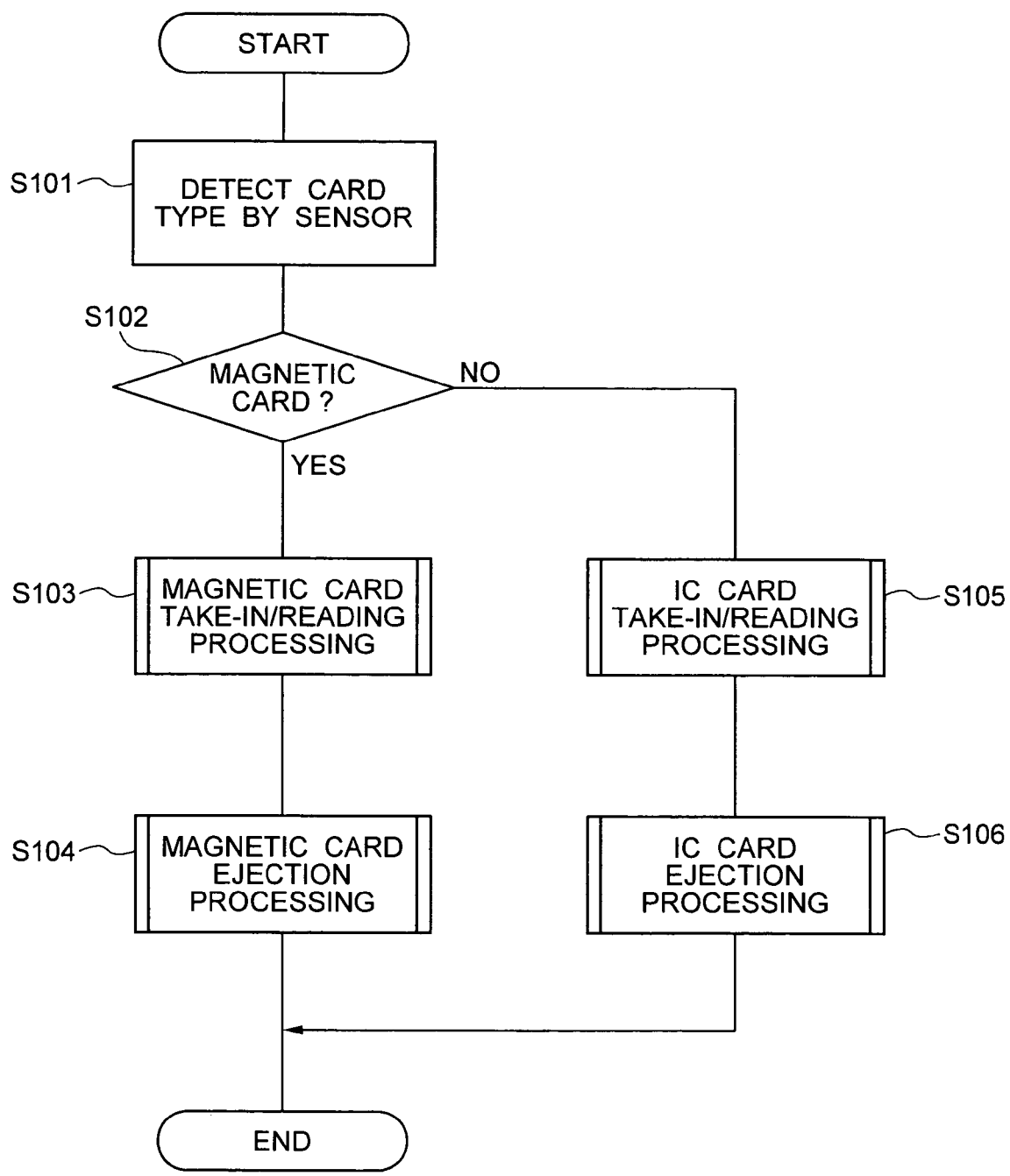
FIG. 12 is a flowchart showing the general operation of the card processing device in another embodiment.

FIG. 12 is a flowchart showing the general operation of the card processing device 100 shown in FIG. 11. In the description below, assume that the higher-level device 10 is an ATM and that the card processing device 100 is mounted on this ATM as in FIG. 4. When the user performs a predetermined operation on the customer panel during a transaction on the ATM using the card 50, the transaction start signal is sent from the higher-level device 10 to the communication unit 9 of the card processing device 100 and, upon receiving this signal, the card processing device 100 starts the card processing. First, when the card 50 is inserted into the card processing device 100, the sensors 41 and 42 detect the type of the card (step S101). That is, in this embodiment, too, the card processing device 100 side recognizes the type of the card in advance before the card 50 is taken in. Next, the card processing device 100 checks if the detected card type is a magnetic card (step S102). If the read signal is output from the magnetic stripe detection sensor 41, the card 50 is a magnetic card; if the detection signal is output from the IC card detection sensor 42, the card 50 is an IC card (contact IC card or non-contact IC card). If the card 50 is a magnetic card (step S102: YES), control is passed to step S103, the magnetic card take-in/reading processing is performed and, after this processing is finished, the magnetic card ejection processing is performed (step S104). The detailed procedure of step S103 is the same as the detailed procedure in FIG. 5, and the detailed procedure of step S104 is the same as the detailed procedure in FIG. 6, and therefore the description of those steps is omitted.

If it is found in step S102 that the card is not a magnetic card (step S102: NO), control is passed to step S105 and the IC card take-in/reading processing is performed. The detailed procedure of this step S105 will be described later. After this processing is finished, the IC card ejection processing is performed (step S106). The detailed procedure of step S106 is the same as that in FIG. 8 and therefore its description is omitted.

Figure 13:
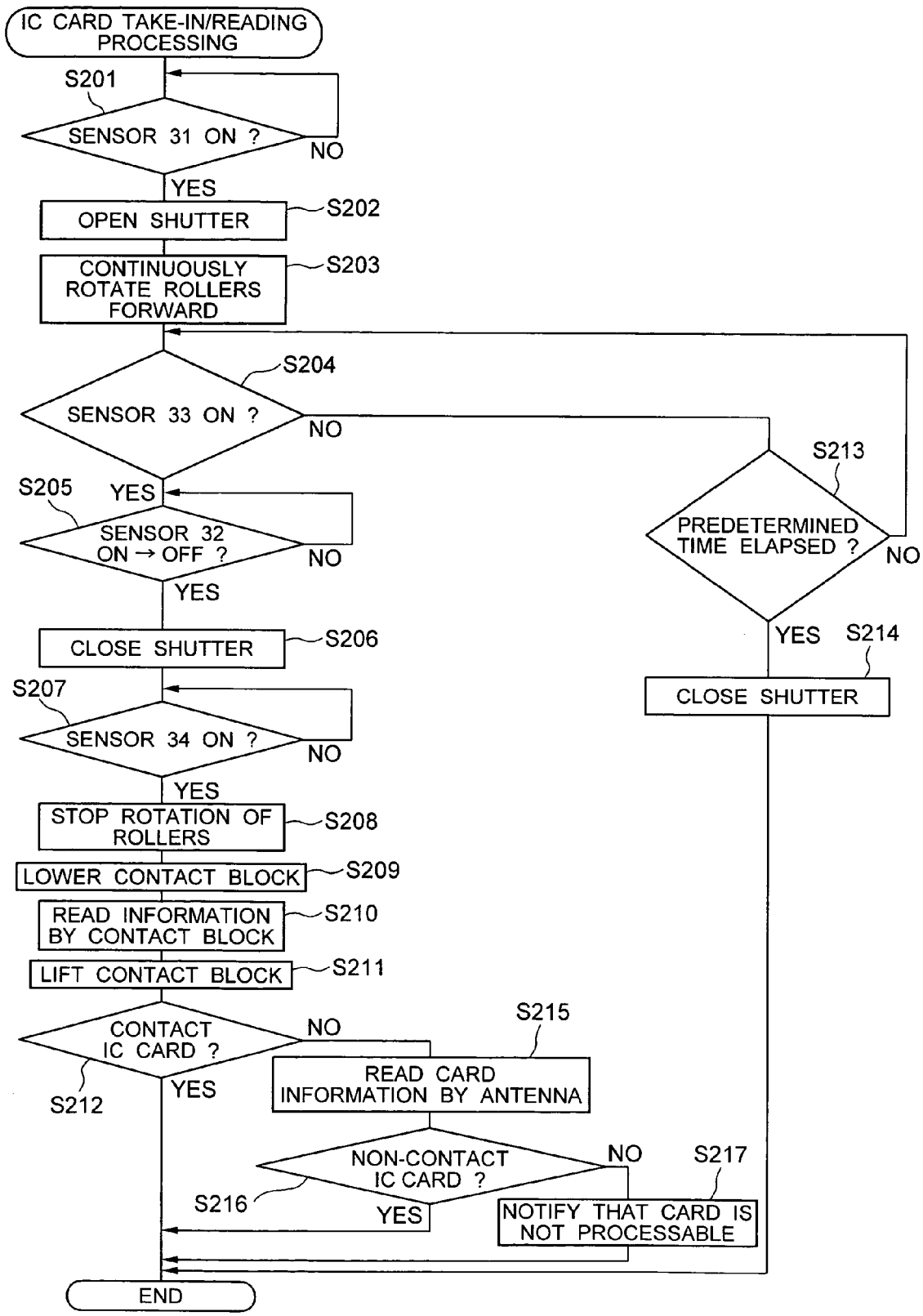
FIG. 13 is a flowchart showing the detailed procedure of the take-in/reading processing of an IC card.

FIG. 13 is a flowchart showing the detailed procedure of the IC card take-in/reading processing in step S105 in FIG. 12. The following describes this procedure. Note that, though FIG. 10A-FIG. 10C are referenced in the description of the procedure, the magnetic stripe detection sensor 41 and the IC card detection sensor 42 are omitted in those figures. A control unit 1 constantly monitors if the sensor 31 provided at a card insertion slot 22 is turned ON (step S201). When the user starts inserting the card 50 (contact IC card 50b or non-contact IC card 50c in this example) into the card insertion slot 22 as shown in FIG. 10A(a) and the card 50 reaches the position of the sensor 31 as shown in FIG. 10A(b), the sensor 31 that detects the card 50 is turned ON (step S201: YES), a shutter solenoid 7 is driven, and a shutter 23 is opened (step S202). After that, a motor 6 is continuously driven forward and rollers 24-27 are also continuously rotated forward by the motor 6 (step S203). As a result, the card 50 whose leading edge (left end) is inserted to the position of the roller 24 is continuously transported in the left direction in the figure by the continuously rotating roller 24. While the card 50 is inserted to the position of the roller 24, a sensor 32 is turned ON.

Next, the control unit checks if a sensor 33 is turned ON (step S204). When the card 50 is transported to the position of the sensor 33 as shown in FIG. 10A(c), the sensor 33 that senses the card 50 is turned ON (step S204: YES). Next, the control unit checks if the sensor 32 has changed from ON to OFF (step S205). When the trailing edge (right end) of the card 50 passes the sensor 32 as shown in FIG. 10B(d), the sensor 32 is changed from ON to OFF (step S205: YES) and, in response to this, the shutter solenoid 7 closes the shutter 23 (step S206).

After that, the card 50 is continuously transported by the rollers 25 and 26 as shown in FIG. 10B(e) and the control unit 1 checks if the sensor 34 is turned ON (step S207). When the card 50 is transported to the position of the sensor 34 as shown in FIG. 10B(f), the sensor 34 that senses the card 50 is turned ON (step S207: YES). When the sensor 34 is turned ON, the control unit 1 determines that the card 50 is transported to the back of the card processing device 100 and stops the motor 6. This also stops the rotation of the rollers 24-27 (step S208). After that, a contact block solenoid 8 lowers a contact block 4 (step S209) to allow the contact block 4 to read the recording information from the card 50 (step S210). In this case, the contact block 4 has on its bottom a contactor that, if the card 50 is a contact IC card 50b, contacts the IC terminal 53 on the card when the contact block 4 is lowered. This causes the contact block 4 to be electrically connected to the card 50 and the information recorded in the IC chip 52 on the card 50 is read by the contact block 4. On the other hand, if the card 50 is not a contact IC card 50b, the contact block 4 and the card 50 are not connected electrically because there is no IC terminal on the card and the information recorded in the IC chip 54 is not read. When the processing in step S210 is finished, the contact block 4 is lifted (step S211).

Next, the control unit checks if the card 50 is a contact IC card based on the reading result of the contact block 4 (step S212). If the contact block 4 can read the information from the card 50, the card is determined to be a contact IC card 50b; if the contact block 4 cannot read the information from the card 50, the card is determined to be a non-contact IC card 50c or some other card. If the card 50 is a contact IC card 50b (step S212: YES), the processing is terminated and control is passed to step S106 in FIG. 12. If the card 50 is not a contact IC card 50b (step S212: NO), control is passed to step S215 to read the information from the card 50 by the antenna 5. And, based on the reading result, the control unit checks if the card 50 is a non-contact IC card 50c (step S216). If the antenna 5 can read the information from the card 50 (step 216: YES), the card is determined to be a non-contact IC card 50c, the processing is terminated, and control is passed to step S106 in FIG. 12. If the antenna 5 cannot read the information from the card 50 (step S216: NO), the card is determined to be a card not processable by the card processing device 100, a notification is sent to the higher-level device 10 to indicate that the card is not processable (step S217), and control is passed to step S106 in FIG. 12.

If the sensor 33 is not turned ON in step S204 (step S204: NO), the control unit checks if a predetermined time has elapsed since the sensor 31 was turned ON (step S213). If the predetermined time has not yet elapsed (step S213: NO), control is returned to step S204 to monitor the state of the sensor 33. If the sensor 33 is not turned ON (step S204: NO)

and the predetermined time has elapsed (step S213: YES), it is determined that the card 50 is not taken into the main body 20. The shutter solenoid 7 closes the shutter 23 (step S214) to terminate the processing.

As described above, when the card 50 (contact IC card 50*b* or non-contact IC card 50*c*) is taken in, the card is continuously transported regardless of its position and taken into the main body 20 of the device according to the procedure shown in FIG. 13. A fake reader, if installed in the card insertion unit 21, can read only the magnetic information but not the information recorded in the IC chip 52 on the contact IC card 50*b* or the information recorded in the IC chip 54 on the non-contact IC card 50*c*, meaning that there is no danger that the card information is illegally obtained even if those cards are continuously transported and taken in. Therefore, the contact IC card 50*b* and the non-contact IC card 50*c* can be taken quickly into the main body 20 of the device.

The control unit 1 sends the information, read from the card 50 by the contact block 4 or the antenna 5, to the higher-level device 10 via the communication unit 9. The higher-level device 10 performs predetermined transaction processing (for example, cash withdrawal) based on the received card information. When the transaction processing is finished, the higher-level device 10 notifies the card processing device 100 that the processing has been finished. When the communication unit 9 receives this notification, the control unit 1 performs the ejection processing of the card 50 (step S106 in FIG. 12).

Figure 14:
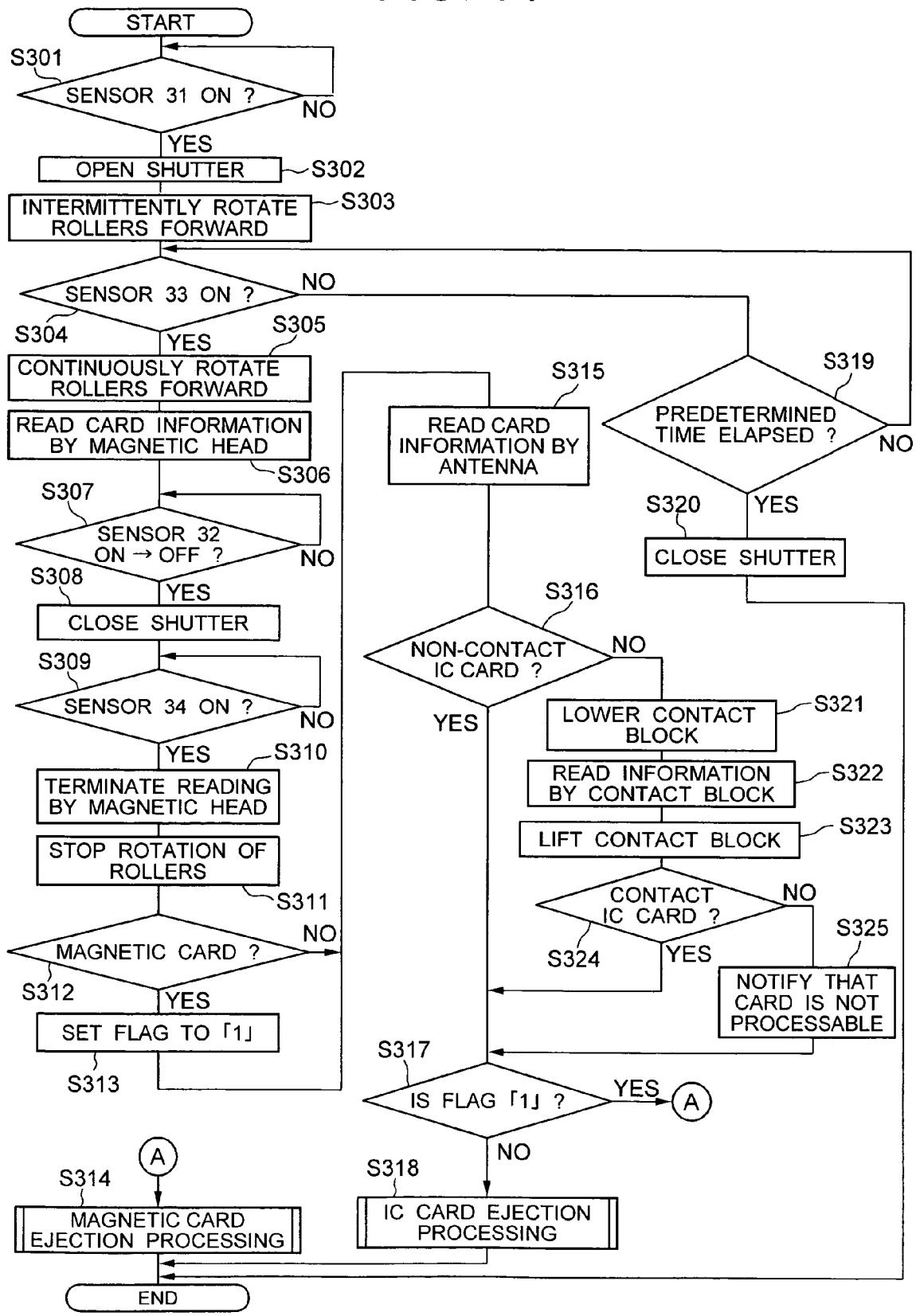
FIG. 14 is a flowchart showing the operation of the card processing device in another embodiment of the present invention.

FIG. 14 is a flowchart showing the operation of a card processing device in another embodiment of the present invention. In this embodiment, the type of a card is not determined in advance before the card is taken in, but the type of a card is determined after the card is taken in. The configuration of the card processing device in this embodiment is the same as that of the card processing device 100 shown in FIG. 1. The following describes the processing procedure shown in FIG. 14.

A control unit 1 constantly monitors if a sensor 31 provided at a card insertion slot 22 is turned ON (step S301). When the user starts inserting a card 50 into the card insertion slot 22 as shown in FIG. 10A(a) and the card 50 reaches the position of the sensor 31 as shown in FIG. 10A(b), the sensor 31 that senses the card 50 is turned ON (step S301: YES), a shutter solenoid 7 is driven, and a shutter 23 is opened (step S302). After that, a motor 6 is intermittently driven forward, and rollers 24-27 are also intermittently rotated forward by this motor (step S303). In this case, the motor 6 is driven as in FIG. 15(*a*) and FIG. 16(*a*) described above.

Next, the control unit checks if a sensor 33 is turned ON (step S304). When the card 50 is transported to the position of the sensor 33 as shown in FIG. 10A(c), the sensor 33 that senses the card 50 is turned ON (step S304: YES) and, in response to this, the driving of the motor 6 is changed from the intermittent driving to the continuous driving to cause the motor 6 to be continuously driven forward. This also causes the rollers 24-27 to be continuously rotated forward (step S305). As a result, the card 50 is transported continuously into the left direction in the figure by the continuously rotating rollers 24 and 25 and is taken into a main body 20. When the card 50 reaches the position of a magnetic head 2 as shown in FIG. 10B(d), the magnetic head 2 starts reading the magnetic information on the card 50 (step S306). Next, the control unit checks if a sensor 32 is changed from ON to OFF (step S307). When the trailing edge (right end) of the card 50 passes the sensor 32 as shown in FIG. 10B(d), the sensor 32 is changed from ON to OFF (step S307: YES) and, in response to this, the shutter solenoid 7 closes the shutter 23 (step S308).

After that, the card 50 is continuously transported by the rollers 25 and 26 as shown in FIG. 10B(e) and, while the card is being transported, the magnetic information on the card 50 is read by the magnetic head 2. On the other hand, the control unit 1 checks if a sensor 34 is turned ON (step S309). When the card 50 is transported to the position of the sensor 34 as shown in FIG. 10B(f), the sensor 34 that senses the card 50 is turned ON (step S309: YES) and, in response to this, the magnetic head 2 terminates reading the magnetic information (step S310). When the sensor 34 is turned ON, the control unit 1 determines that the card 50 is transported to the back of the card processing device 100 and stops the motor 6. This also stops the rotation of the rollers 24-27 (step S311).

Next, the control unit checks if the card 50 is a magnetic card based on the reading result of the magnetic head 2 (step S312). If the card 50 is a magnetic card 50*a*, the magnetic head 2 reads magnetic information from the magnetic stripe 51 in step S306 and outputs the read signal; if the card 50 is not a magnetic card 50*a*, the magnetic head cannot read magnetic information and does not output the read signal. Therefore, the presence of the read signal from the magnetic head 2 indicates whether or not the card 50 is a magnetic card. If the card 50 is a magnetic card (step S312: YES), the flag "1" is set in the register provided in the control unit 1 (step S313) and control is passed to step S315. If the card 50 is not a magnetic card (step S312: NO), the flag "1" is not set in the register and control is passed to step S315.

In step S315, an antenna 5 reads information from the card 50. And, based on the reading result, a check is made to determine whether the card 50 is a non-contact IC card (step S316). If the card 50 is a non-contact IC card 50*c*, the wireless communication between an antenna 54 and the antenna 5 is possible and the information can be read from the card 50; if the card 50 is not a non-contact IC card 50*c*, the wireless communication between the antenna 54 and the antenna 5 is not possible and the information cannot be read from the card 50. Therefore, whether or not the antenna 5 can read information from the card 50 indicates whether or not the card 50 is a non-contact IC card.

If the card 50 is a non-contact IC card (step S316: YES), whether the flag is "1" is checked next (step S317). When the card is a hybrid-type non-contact IC card with a magnetic stripe, "1" was set in the flag in step S313 and therefore the result of the checking in step S317 is YES. In this case, because there is a possibility that the information recorded in the magnetic stripe is illegally obtained even if the card is a non-contact IC card, control is passed to the magnetic card ejection processing in step S314 and the card is intermittently transported and ejected. The processing is step S314 is the same as that in FIG. 6 and therefore the description is omitted here. On the other hand, when the card is a non-contact IC card without a magnetic stripe, the flag was not set to "1" in step S313 and therefore the result of the checking in step S317 is NO. In this case, because there is no possibility that the magnetic information is illegally obtained, control is passed to the IC card ejection processing in step S318 and the card is continuously transported and ejected. The processing is step S318 is the same as that in FIG. 8 and therefore the description is omitted here.

If it is found in step S316 that the card 50 is not a non-contact IC card (step S316: NO), a contact block solenoid 8 lowers a contact block 4 (step S321) to allow the contact block 4 to read the recording information from the card 50 (step S322). In this case, the contact block 4 has on its bottom a contactor that, if the card 50 is a contact IC card 50*b*, contacts an IC terminal 53 on the card when the contact block 4 is lowered. This causes the contact block 4 to be electrically connected to the card 50 and the information recorded in the IC chip 52 on the card 50 is read by the contact block 4. On the other hand, if the card 50 is not a contact IC card 50b, the contact block 4 and the card 50 are not connected electrically because there is no IC terminal on the card and the information recorded in the IC chip 54 is not read. When the processing in step S322 is finished, the contact block 4 is lifted (step S323).

Next, based on the reading result of the contact block 4, a check is made whether the card 50 is a contact IC card (step S324). If the contact block 4 can read the information from the card 50, the card is a contact IC card 50b; if the contact block 4 cannot read the information from the card 50, the card is a card other than a contact IC card 50b. If the card 50 is a contact IC card 50b (step S324: YES), control is passed to step S317 and a check is made whether the flag is "1". If the card is a hybrid-type contact IC card with a magnetic stripe, the flag was set to "1" in step S313 and therefore the result of the checking in step S317 is YES. In this case, because there is a possibility that the information recorded in the magnetic stripe is illegally obtained even if the card is a contact IC card, control is passed to the magnetic card ejection processing in step S314 and the card is intermittently transported and ejected. On the other hand, if the card is a contact IC card without a magnetic stripe, the flag was not set to "1" in step S313 and therefore the result of the checking in step S317 is NO. In this case, because there is no possibility that the magnetic information is illegally obtained, control is passed to the IC card ejection processing in step S318 and the card is continuously transported and ejected.

If it is found in step S324 that the card 50 is not a contact IC card (step S324: NO), the card is a card not processable by the card processing device 100, a notification is sent to the higher-level device 10 to indicate that the card is not processable (step S325), control is passed to step S317 and, after that, the processing according to the above procedure is performed.

If the sensor 33 is not turned ON in step S304 (step S304: NO), the control unit checks if a predetermined time has elapsed since the sensor 31 was turned ON (step S319). If the predetermined time has not yet elapsed (step S319: NO), control is returned to step S304 to monitor the state of the sensor 33. If the sensor 33 is not turned ON (step S304: NO) and the predetermined time has elapsed (step S319: YES), it is determined that the card 50 is not taken into the main body 20. The shutter solenoid 7 closes the shutter 23 (step S320) to terminate the processing.

In the procedure shown in FIG. 14, the magnetic head 2, the contact block 4, or the antenna 5 is used as described above to determine the type of a card after it is taken in even when the type of the card is not known before the card is taken in and, based on the result, the card ejection processing is performed. Thus, when a card is taken in, though a contact IC card 50b or a non-contact IC card 50c is intermittently transported in the same way as a magnetic card 50a and this intermittent transport prolongs the take-in time, the contact IC card 50b and the non-contact IC card 50c are continuously transported regardless of its position during the card ejection and is ejected quickly. A magnetic card 50a is continuously transported halfway and, after that, intermittently transported and ejected to reduce its ejection time while preventing card information from being obtained illegally.

In the embodiments described above, when a card is taken in, the card transport is switched from the intermittent transport to the continuous transport with a part of the card 50 exposed outside the main body 20 as shown in FIG. 10A(c). It is also possible to switch the transport from the intermittent transport to the continuous transport after the card 50 is taken into the main body 20 and is not exposed outside. In this case, the position of the sensor 33 should be shifted left from the position shown in the figure. Although the take-in time is somewhat prolonged, this configuration prevents the fake reader from reading the card information because the card 50 is intermittently transported while it is exposed outside the main body 20, thus reliably preventing the information from being obtained illegally during the card take-in time.

In the embodiments described above, the card transport is switched from the continuous transport to the intermittent transport during card ejection with a part of the card 50 exposed outside the main body 20 as shown in FIG. 10C(i). It is also possible to switch the transport from the continuous transport to the intermittent transport immediately before the card 50 is exposed outside the main body 20. In this case, the transport should be switched to the intermittent transport when the leading edge (right end) of the card 50 reaches the position of the sensor 32. Although the ejection time is somewhat prolonged, this configuration prevents the fake reader from reading the card information because the card 50 is intermittently transported while the card is exposed outside the main body 20, thus reliably preventing the information from being obtained illegally during the card ejection time.

In the embodiments above, the examples in FIG. 15(a) and FIG. 16(a) are shown as methods for intermittently transporting the card 50. Instead of those methods, it is also possible to supply the control amounts (driving voltages), such as those shown in FIG. 15(b)-FIG. 15(d), to the motor 6 to cause the motor 6 to perform the intermittent rotation operations, such as those in FIG. 16(b)-FIG. 16(d), respectively. In FIG. 16(b), the motor 6 rotates forward a two-unit rotation in one-unit time, rotates backward a one-unit rotation in the next one-unit time, and repeats this operation. In FIG. 16(c), the motor 6 rotates forward a two-unit rotation in one-unit time, stops in the next one-unit time, rotates backward a one-unit rotation in the next one-unit time, stops in the next one-unit time, and repeats this operation. In FIG. 16(d), the rotation period and the stop period in FIG. 16(a) are made irregular to repeat the rotation and the stop randomly. In addition, the rotation period and the stop period in FIGS. 16(b) and 16(c) may be made irregular to repeat the rotation and the stop randomly.

In the embodiments above, the sensors 31 to 34, each composed of a photo micro-sensor, are provided as the examples of position detection means for detecting the position of the card 50. Instead, a rotary encoder that outputs a signal corresponding to the rotation amount of the roller 24-27 or the motor 6 may also be used as the position detection means. In this case, the rotation amount of the rollers or the motor is calculated from the output signal of the rotary encoder to detect the position of the card 50 from the calculated rotation amount. Instead of the sensors and the rotary encoder described above, a timer and a calculation unit may also be used as the position detection means. In this case, the calculation unit calculates the card movement distance based on the timer measurement time and the card transport speed to detect the card position from the calculated movement distance.

In the embodiments described above, the card processing device 100 is mounted on an ATM. The card processing device according to the present invention may be mounted not only on an ATM but also on various apparatuses such as a CD (cash dispenser), an automatic ticket machine, and a vending machine.

The invention claimed is:

1. A card processing device that handles a first card on which magnetic information is recorded and a second card on which magnetic information is not recorded, comprising:

transportation means for transporting the first and second cards; and control means for controlling said transportation means according to a type of a card, wherein, when a card is taken in and/or ejected, said control means controls said transportation means in such a way that the first card is intermittently transported and the second card is continuously transported; and wherein, when a card is taken in and if the card inserted from a card insertion slot is the first card, said transportation means takes in the first card by intermittently transporting the first card to a predetermined position and, from the predetermined position, by continuously transporting the first card and, if the card inserted from the card insertion slot is the second card, said transportation means takes in the second card by continuously transporting the second card regardless of a position thereof.

2. A card processing device that handles a first card on which magnetic information is recorded and a second card on which magnetic information is not recorded, comprising:

transportation means for transporting the first and second cards; and control means for controlling said transportation means according to a type of a card, wherein, when a card is taken in and/or ejected, said control means controls said transportation means in such a way that the first card is intermittently transported and the second card is continuously transported; and wherein, when a card is ejected and if the card that is ejected is the first card, said transportation means ejects the first card by continuously transporting the first card to a predetermined position and, from the predetermined position, by intermittently transporting the first card and, if the card that is ejected is the second card, said transportation means ejects the second card by continuously transporting the second card regardless of a position thereof.

3. A card processing device that handles a first card on which magnetic information is recorded and a second card on which magnetic information is not recorded, comprising:

transportation means for transporting the first and second cards; and control means for controlling said transportation means according to a type of a card, wherein, when a card is taken in and/or ejected, said control means controls said transportation means in such a way that the first card is intermittently transported and the second card is continuously transported;

wherein, when a card is taken in and if the card inserted from a card insertion slot is the first card, said transportation means takes in the first card by intermittently transporting the first card to a first position in a main body of said card processing device and, from the first position, by continuously transporting the first card and, if the card inserted from the card insertion slot is the second card, said transportation means takes in the second card by continuously transporting the second card regardless of a position thereof, and wherein, when a card is ejected and if the card that is ejected is the first card, said transportation means ejects the first card by continuously transporting the first card to a second position near the card insertion slot and, from the second position, by intermittently transporting the first card and, if the card that is ejected is the second card, said transportation means ejects the second card by continuously transporting the second card regardless of a position thereof.

4. A card processing device that handles a first card on which magnetic information is recorded and a second card on which magnetic information is not recorded, comprising:

first reading means, provided inside a main body of said card processing device, for reading recorded information of the first card that is taken in;

second reading means, provided inside the main body of said card processing device, for reading recorded information of the second card that is taken in;

transportation means for transporting the first and second cards; and control means for controlling said transportation means according to a type of a card, wherein, when a card is taken in, said control means controls said transportation means in such a way that, for both the first and second cards, the card is taken in by intermittently transporting the card and, at the same time, determines the type of the card that is taken in based on a reading result of said first reading means or said second reading means and, wherein, when a card is ejected, said control means controls said transportation means in such a way that the first card is ejected by intermittently transporting the first card, and the second card is ejected by continuously transporting the second card, according to the determined type of the card.

5. The card processing device according claim 4, wherein, when the first card is exposed outside the main body of said card processing device, said transportation means intermittently transports the card and, when the first card is not exposed outside the main body of said card processing device, continuously transports the card.

* * * * *